United States Patent [19]

Sandberg et al.

[11] Patent Number: 5,276,806

[45] Date of Patent: Jan. 4, 1994

[54] OBLIVIOUS MEMORY COMPUTER NETWORKING

[75] Inventors: Jonathan S. Sandberg, New York, N.Y.; Richard J. Lipton, West Windsor, N.J.

[73] Assignee: Princeton University, Princeton, N.J.

[21] Appl. No.: 249,645

[22] Filed: Sep. 19, 1988

[51] Int. Cl.⁵ .......................................... G06F 15/16
[52] U.S. Cl. ................................ 395/200; 395/425; 364/DIG. 1; 364/228.3; 364/232.8; 364/243.1; 364/246.6; 364/268.3; 364/285; 364/295.1
[58] Field of Search ............... 364/200; 371/8.1, 9.1, 371/10.1; 395/200, 425, 575

[56] References Cited

U.S. PATENT DOCUMENTS

| | | | |
|---|---|---|---|
| 3,581,291 | 5/1971 | Iwamoto et al. | 395/425 |
| 3,771,137 | 11/1973 | Barner et al. | 395/425 |
| 4,118,771 | 10/1978 | Pomella et al. | 395/650 |
| 4,181,935 | 1/1980 | Fesser et al. | 364/200 |
| 4,212,057 | 7/1980 | Devlin et al. | 395/425 |
| 4,213,177 | 7/1980 | Schmidt | 395/500 |
| 4,215,398 | 7/1980 | Burkett et al. | 395/200 |
| 4,223,380 | 9/1980 | Antonaccio et al. | 395/200 |
| 4,256,926 | 3/1981 | Pitroda et al. | 395/200 |
| 4,333,144 | 6/1982 | Whiteside et al. | 395/650 |
| 4,351,023 | 9/1982 | Richer | 371/9.1 |
| 4,358,823 | 11/1982 | McDonald et al. | 371/9.1 |
| 4,371,929 | 2/1983 | Brann et al. | 395/425 |
| 4,400,775 | 8/1983 | Nozaki et al. | 395/200 |
| 4,410,944 | 10/1983 | Kronies | 395/200 |
| 4,414,620 | 11/1983 | Tsuchimoto et al. | 395/200 |
| 4,445,174 | 4/1984 | Fletcher | 395/425 |
| 4,471,427 | 9/1984 | Harris | 395/275 |
| 4,471,429 | 9/1984 | Porter et al. | 395/400 |
| 4,503,496 | 3/1985 | Holzner et al. | 395/425 |
| 4,503,497 | 3/1985 | Krygowski et al. | 395/425 |
| 4,504,902 | 3/1985 | Gallaher et al. | 395/425 |
| 4,543,627 | 9/1985 | Schwab | 395/200 |
| 4,577,273 | 3/1986 | Hopper et al. | 395/725 |
| 4,581,701 | 4/1986 | Hess et al. | 371/9.1 |
| 4,591,977 | 5/1986 | Nissen et al. | 395/200 |
| 4,703,421 | 10/1987 | Albrant et al. | 395/575 |
| 4,751,702 | 6/1988 | Beier et al. | 371/9.1 |
| 4,849,978 | 7/1989 | Dishon et al. | 371/10.1 |
| 4,991,079 | 2/1991 | Dann | 395/200 |

FOREIGN PATENT DOCUMENTS

| | | |
|---|---|---|
| 0092895 | 11/1983 | European Pat. Off. |
| 0313668 | 3/1989 | European Pat. Off. |
| 2195038A | 3/1988 | United Kingdom |

OTHER PUBLICATIONS

IBM Technical Disclosure Bulletin vol. 23, No. 5 Oct. 1980, pp. 1811–1812.

10th Annual Symposium on Computer Architecture, 1983, Sweden pp. 334–340.

*Primary Examiner*—Debra A. Chun
*Attorney, Agent, or Firm*—Perman & Green

[57] ABSTRACT

Independent heterogeneous computers are interconnected for oblivious, high speed, long distance communications. A printed circuit board with onboard RAM repeats all write commands through a data transmission media to a remote system. Each read and write cycle of the communicating computer is completed locally (using only local RAM). Apart from repeating write commands to a remote system, the invention is oblivious to the remote system. Data is transmitted from one machine to another without expensive communication protocols or transmission line latency induced wait states. A remote computer accesses network data only after it has been transmitted and stored in local memory. Multiple data transfers can be pipelined, that is, multiple datum may simultaneously reside in a high latency network/long transmission line. Although the time required to transmit any single datum remains proportional to the signal propagation delay, the time required to transmit multiple data is significantly reduced. Geographic separation, high speed transmission lines, low speed transmission lines, alternative means for data transmission, fault tolerance, one-way communications, multi-way communications, and high security can be supported by a single computer network of heterogeneous machines.

9 Claims, 30 Drawing Sheets

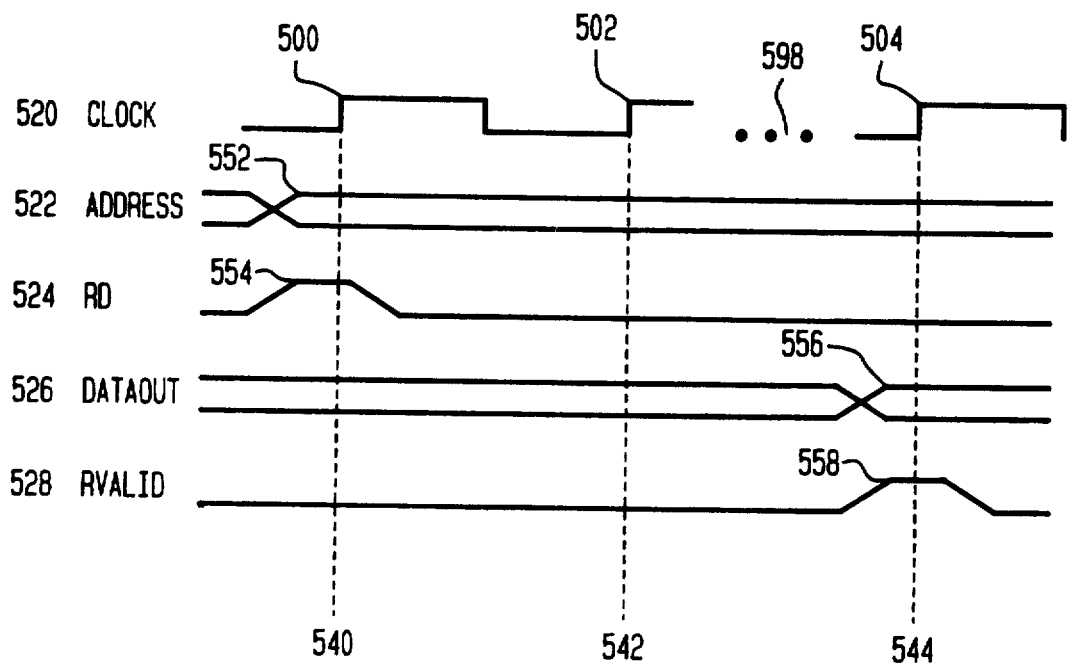
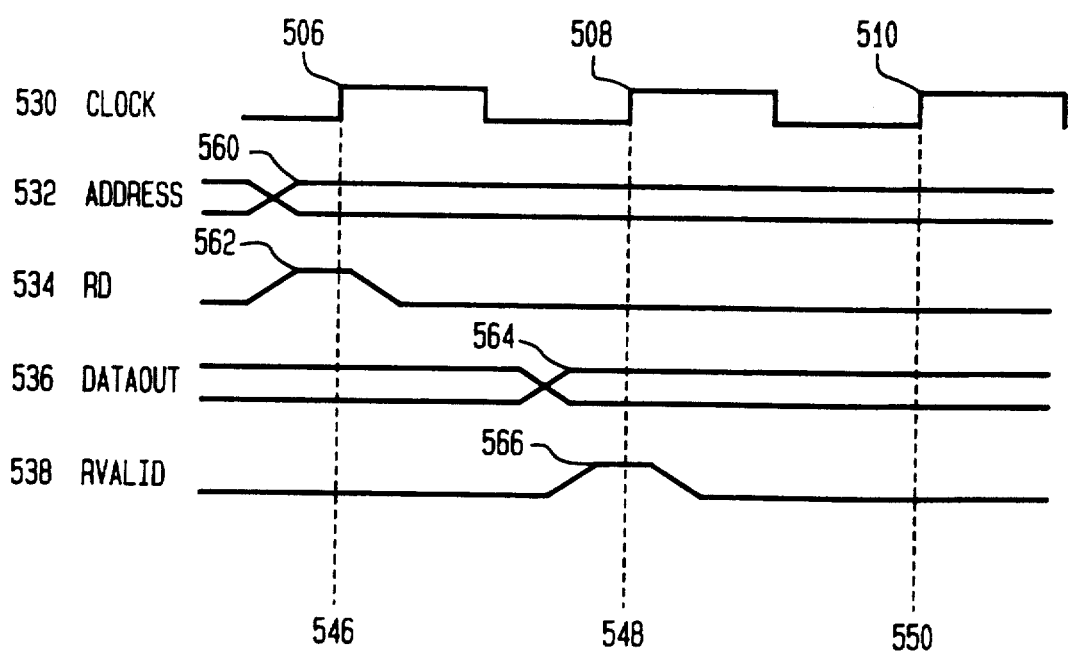

REMOTE WRITE

INVENTION WRITE

FIG. 3
INVENTION INCOHERENCE EXAMPLE

| TIME | MACHINE | COMMAND | RESULT |
|---|---|---|---|
| t | A | WRITE (1000, 20) | - |
| t+1 | A | READ (1000) | 20 |
| t+2 | B | WRITE (1000, 77) | - |
| t+3 | B | READ (1000) | 77 |
| t+3 | A | READ (1000) | 20 |
| ... | | | |
| t+d | B | WRITE (1000, 20) | - |
| t+d+1 | B | READ (1000) | 20 |
| t+d+1 | A | READ (1000) | 20 |
| t+d+2 | A | WRITE (1000, 77) | - |
| t+d+2 | A | READ (1000) | 20 |
| t+d+3 | A | READ (1000) | 77 |
| t+d+3 | B | READ (1000) | 20 |

FIG. 4

| TIME | INVENTION A | INVENTION B | PRIOR ART C | PRIOR ART D |
|---|---|---|---|---|
| 0 | WRITE (100, 1) |  | WRITE (100, 1) |  |
| t | WRITE (250, 'a') | READ (100) | WRITE (250, 'a') | READ (100) |
| t+1 | WRITE (251, 'b') | READ (100) | - | READ (100) |
| t+2 | WRITE (252, 'c') | READ (100) | - | READ (100) |
| t+3 | WRITE (253, 'd') | READ (100) | - | READ (100) |
| t+4 | WRITE (254, 'e') | READ (100) | - | READ (100) |
| t+5 | WRITE (255, 'f') | READ (100) | - | READ (100) |
| t+6 | WRITE (256, 'g') | READ (100) | - | READ (100) |
| t+7 | WRITE (257, 'h') | READ (100) | WRITE (251, 'b') | READ (100) |
| t+8 | WRITE (258, 'i') | READ (100) | - | READ (100) |
| t+9 | WRITE (259, 'j') | READ (100) | - | READ (100) |
| t+10 | WRITE (100, 0) | READ (100) | - | READ (100) |
| t+11 | + | READ (100) | - | READ (100) |
| t+12 | + | READ (100) | - | READ (100) |
| t+13 | + | READ (100) | - | READ (100) |
| t+14 | + | READ (100) | WRITE (252, 'c') | READ (100) |
| t+15 | + | READ (100) | - | READ (100) |
| t+16 | + | READ (100) | - | READ (100) |
| t+17 | + | * READ (100) | - | READ (100) |
| t+18 | + | READ (250) | - | READ (100) |
| t+19 | + | READ (251) | - | READ (100) |
| t+20 | + | READ (252) | - | READ (100) |
| t+21 | + | READ (253) | WRITE (253, 'd') | READ (100) |
| t+22 | + | READ (254) | - | READ (100) |
| t+23 | + | READ (255) | - | READ (100) |
| t+24 | + | READ (256) | - | READ (100) |
| t+25 | + | READ (257) | - | READ (100) |
| t+26 | + | READ (258) | - | READ (100) |
| t+27 | + | READ (259) | - | READ (100) |
| t+28 | + | + | WRITE (254, 'e') | READ (100) |
| t+63 | + | + | WRITE (259, 'j') | READ (100) |
| t+70 | + | + | WRITE (100, 0) | READ (100) |
| t+77 | + | + | + | * READ (100) |
| t+78 | + | + | + | READ (250) |
| t+79 | + | + | + | READ (251) |
| t+87 | + | + | + | READ (259) |

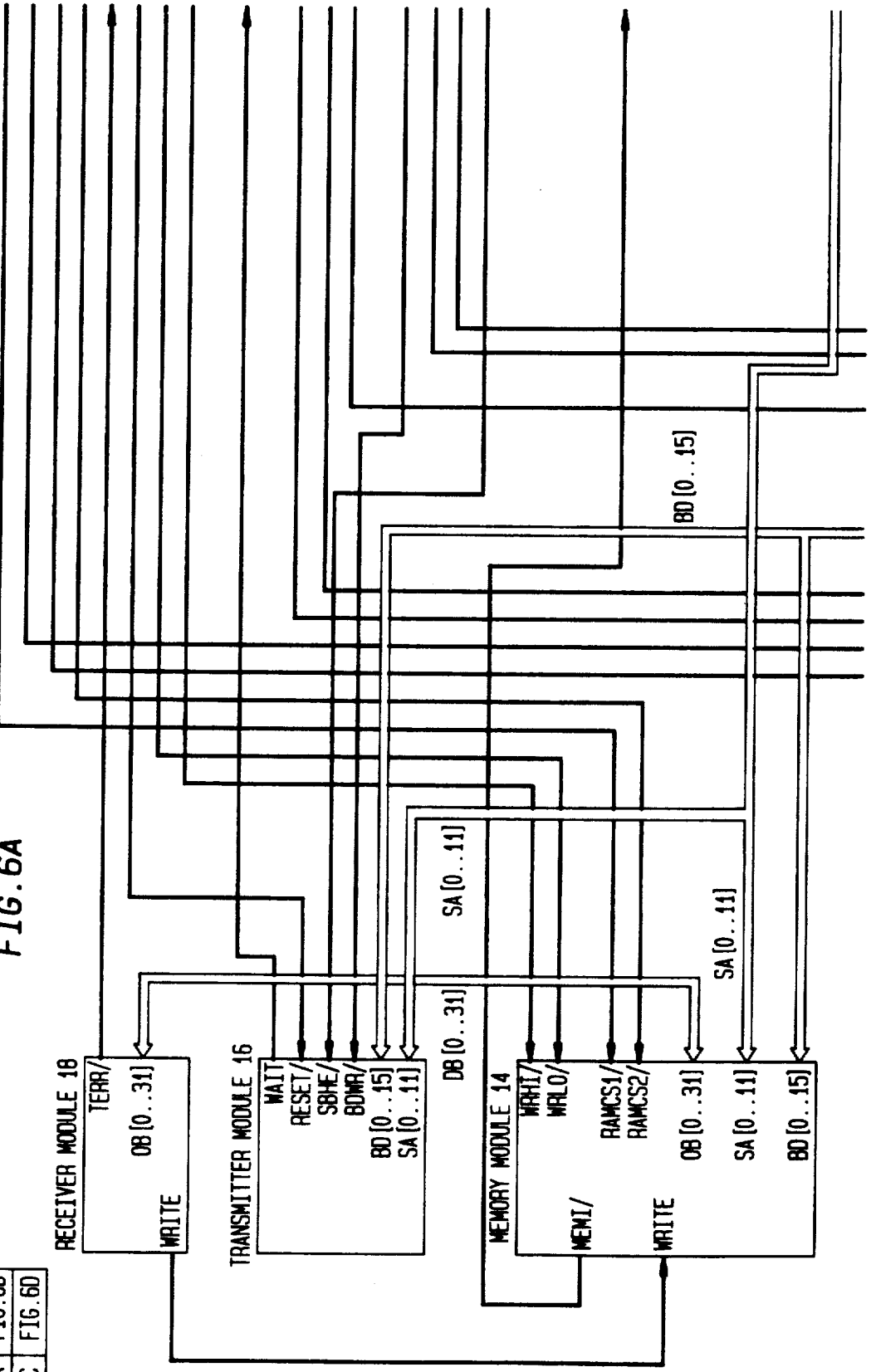

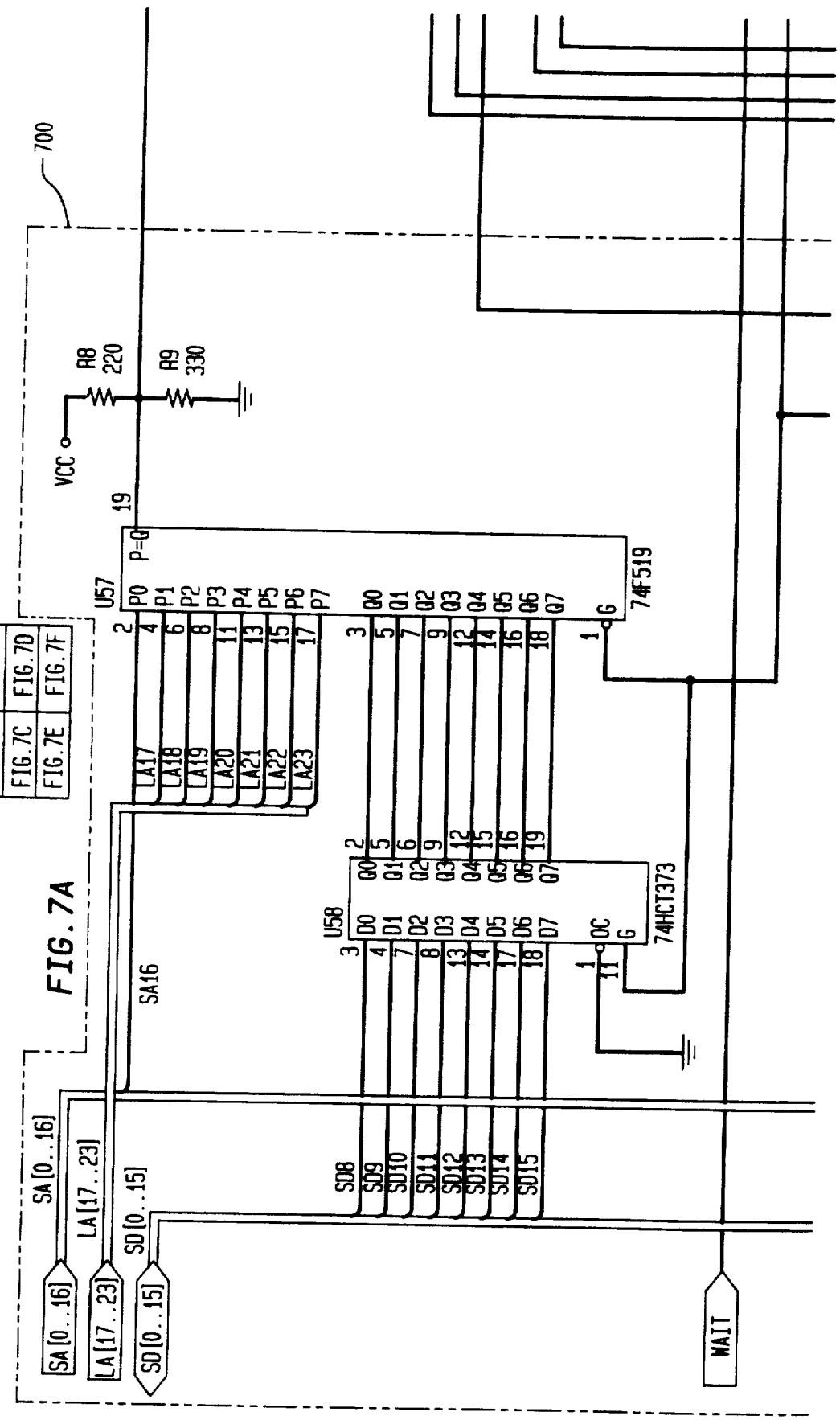

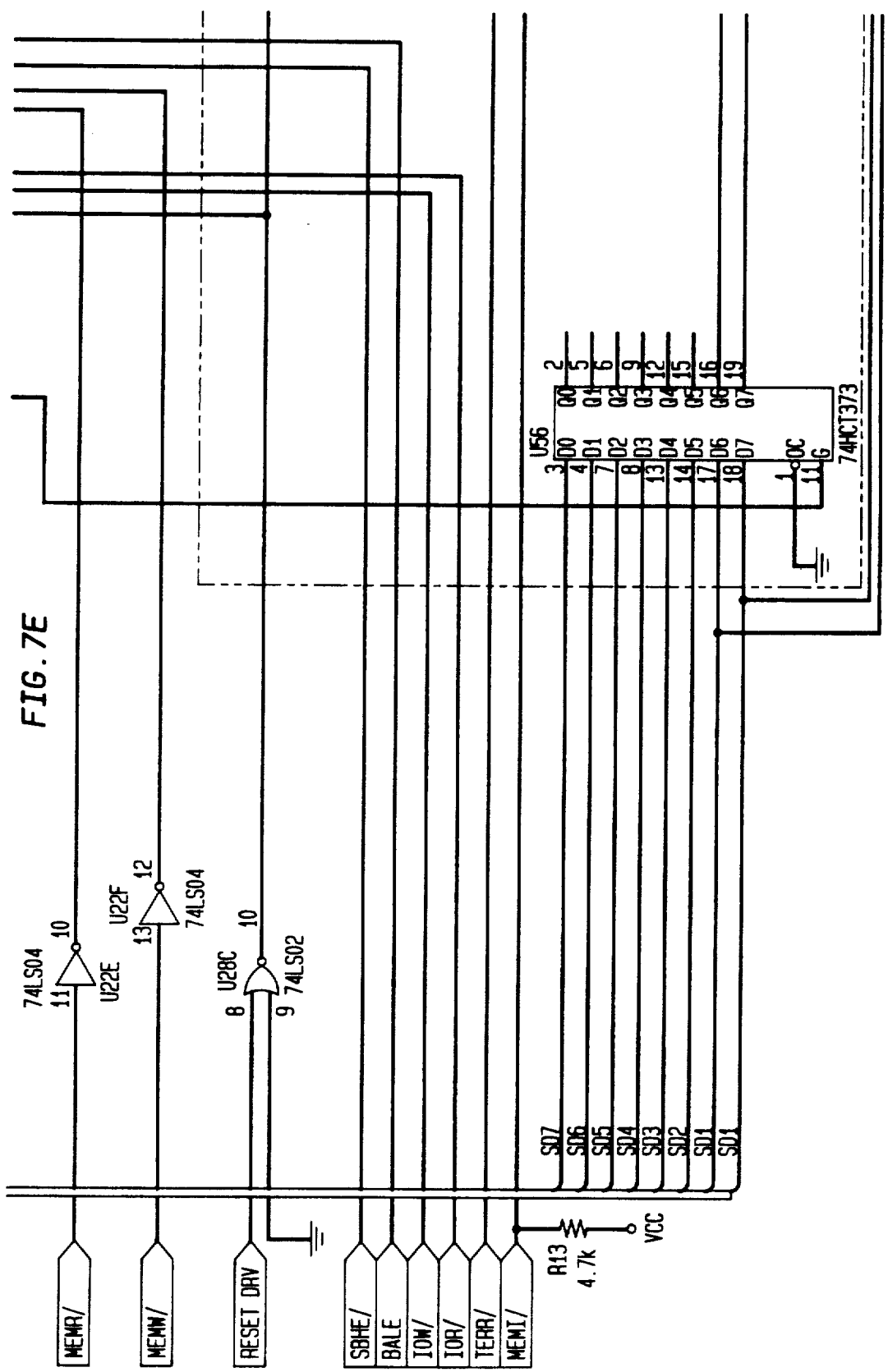

FIG. 8

```
       PAL EQUATIONS - MEMPAL PAL20L10 [38]
IF (VCC) MEMON = BALE * BDSEL + MEMON * /MEMOFF
IF (VCC) MEMOFF = BALE * /BDSEL + MEMOFF * /MEMON
IF (VCC) RDLO = MEMR * /SA0 * MEMON
IF (VCC) RDHI = MEMR * SBHE * MEMON
IF (VCC) WRLO = MEMW * /SA0 * MEMON
IF (VCC) WRHI = MEMW * SBHE * MEMON
IF (VCC) BDWR = MEMW * MEMON
IF (BDSEL) MEMCS16 = BDSEL
IF (VCC) RAMCS1 = MEMR * MEMON + MEMW * MEMON * /SA11
IF (VCC) RAMCS2 = MEMR * MEMON * SA11 + MEMW * MEMON * SA11

PAL EQUATIONS - I/O PAL PAL20L10 [40]
IF (VCC) BDEN = IOSEL * /SA1 * /SA0 * IOW * SA15 * SA14 * SA10 +
         BDEN * /RESET * /BDOFF
IF (VCC) BDOFF = IOSEL * /SA1 * /SA0 * IOW * SA15 * SA14 * /SA10
IF (IOSEL * /SA1 * SA0 * SA15 * SA14) IOCS16 = IOSEL
IF (VCC) RDINT = IOSEL * /SA1 * /SA0 * IOR * SA15 * SA14 * SA10
IF (ISEL0 * ISEL1 * BDEN * /BDOFF) INT12 = /INT
IF (ISEL0 * /ISEL1 * BDEN * /BDOFF) INT11 = /INT
IF (/ISEL0 * ISEL1 * BDEN * BDOFF) INT10 = /INT
IF (/ISEL0 * /ISEL1 * BDEN * /BDOFF) INT9 = /INT

PAL EQUATIONS - INTPAL PAL16L8 [42]
IF (VCC) TSEEN = /RDINT * TI + TSEEN * /THLD
IF (VCC) THLD = /RDINT * /TI + THLD * /TSEEN
IF (VCC) MSEEN = /RDINT * MI + MSEEN * /MHLD
IF (VCC) MHLD = /RDINT * /MI + MHLD * /MSEEN
IF (VCC) INT = MEMR * TSEEN + MEMR * MSEEN
IF (RDINT) D0 = /TSEEN
IF (RDINT) D1 = /MSEEN
```

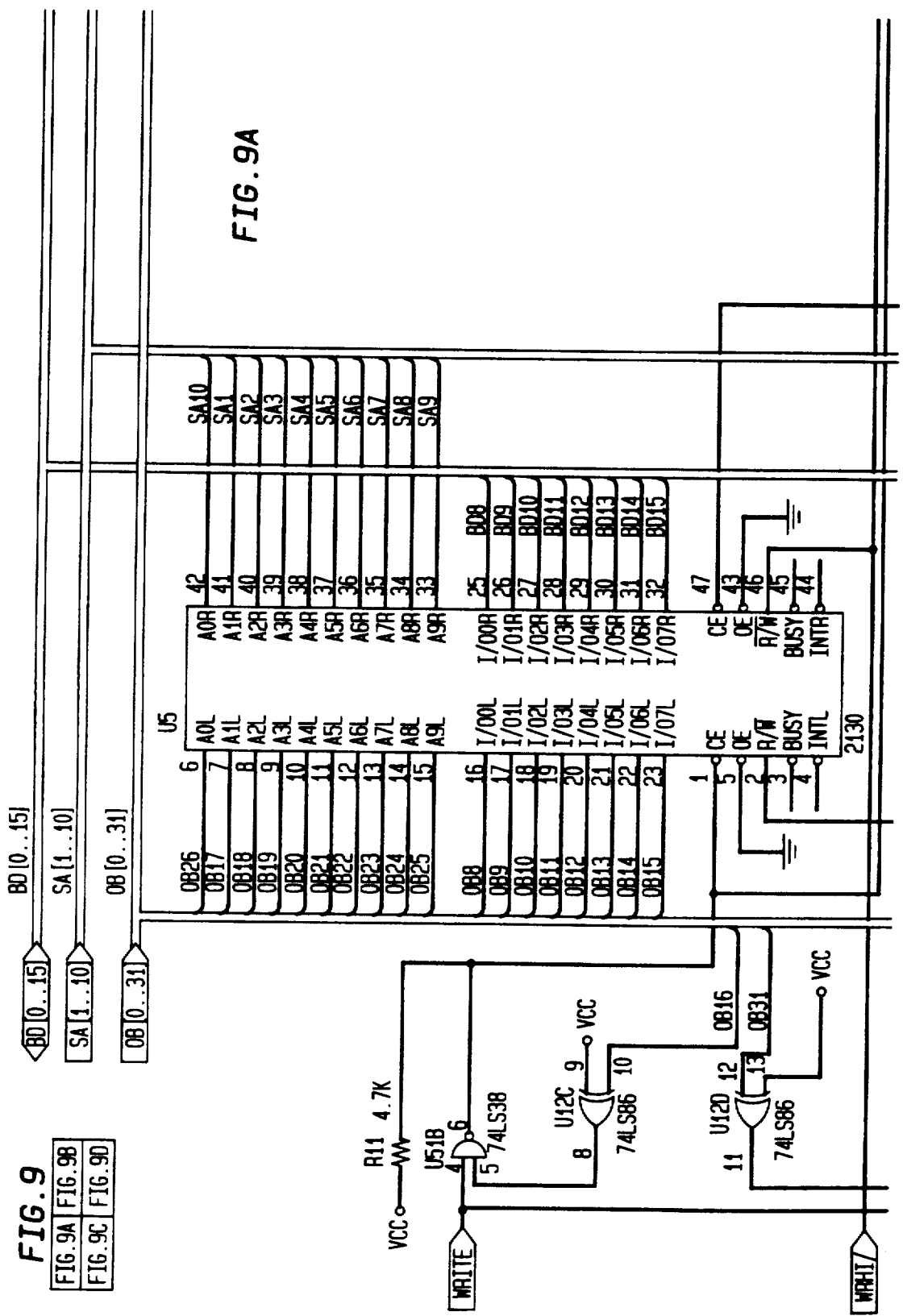

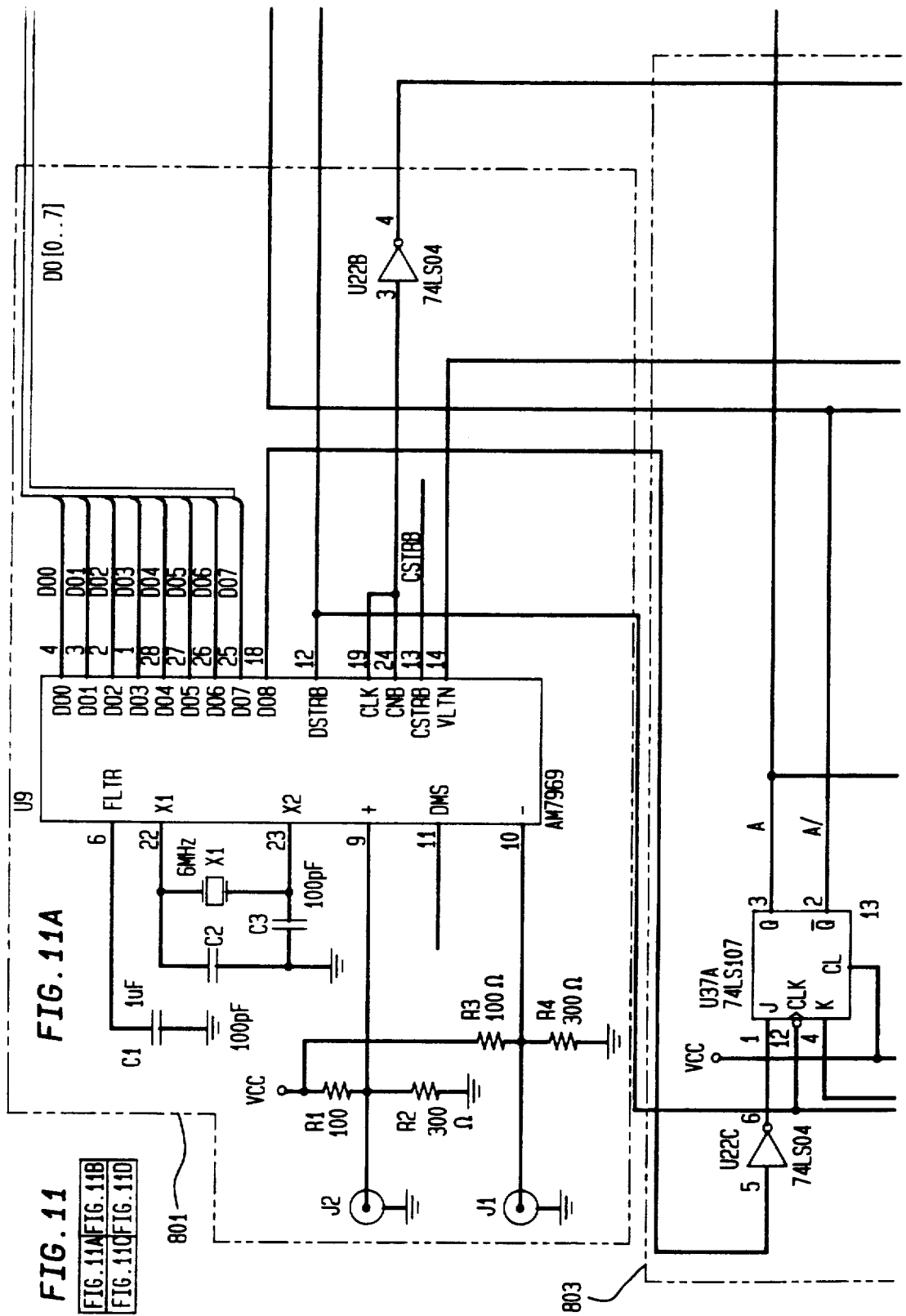

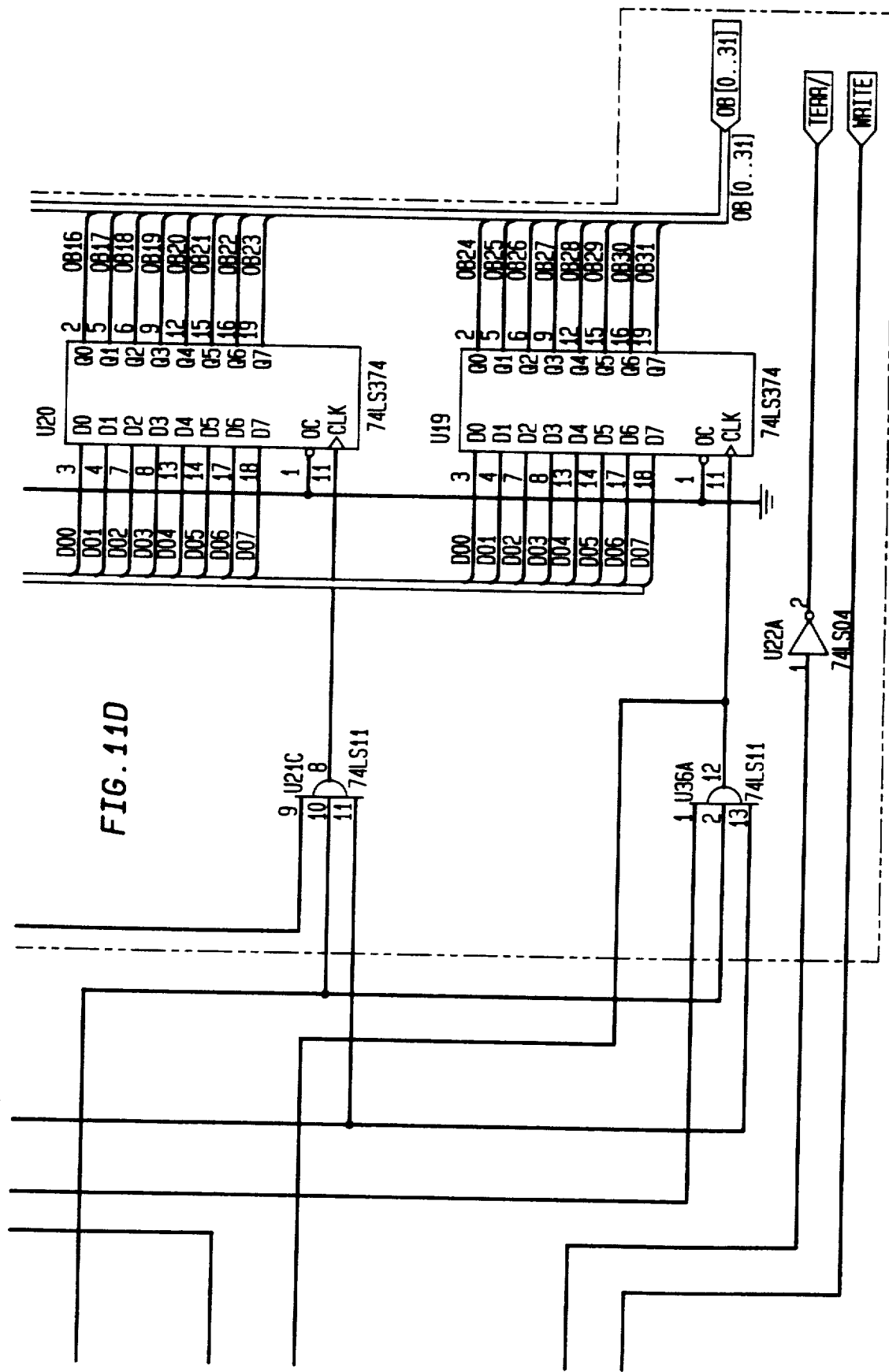

FIG. 13

| ITEM | QUANTITY | REFERENCE | PART |
|---|---|---|---|
| 1 | 1 | [26] | B CONN |
| 2 | 1 | [24] | A CONN |
| 3 | 1 | [30] | D CONN |
| 4 | 1 | [28] | C CONN |
| 5 | 1 | R8 | 220 OHMS |
| 6 | 1 | R9 | 330 OHMS |
| 7 | 2 | U53, 54 | AMPAL20L10BPG |
| 8 | 1 | U55 | PAL16L8ACN |
| 9 | 2 | U56, U58 | 74HCT373 |
| 10 | 1 | U59 | 74ALS520 |
| 11 | 1 | U60 | 74HCT109 |
| 12 | 1 | U40 | SW DIP-8 |
| 13 | 1 | U22 | 74LS04 |
| 14 | 1 | U28 | 74LS02 |
| 15 | 3 | R10, R11, R12 | 4.7K |
| 16 | 1 | U12 | 74LS86 |
| 17 | 1 | R13 | 4.7K |
| 18 | 1 | U57 | 74F519 |
| 19 | 1 | U51 | 74LS38 |
| 20 | 2 | C1, C8 | 1uF CERAMIC |
| 21 | 4 | C2, C3, C6, C7 | 100pF DM |
| 22 | 2 | X1, X2 | 6MHz |
| 23 | 9 | U6, U3, U4, U7, U8, U15, U16, U19, U20 | 74LS374 |
| 24 | 1 | U9 | AM7969 |
| 25 | 2 | U21, U36 | 74LS11 |
| 26 | 2 | U38, U29 | 74LS74 |
| 27 | 3 | U37, U14, U44 | 74LS107 |
| 28 | 2 | R1, R3 | 100 OHMS |
| 29 | 2 | R2, R4 | 300 OHMS |
| 30 | 4 | J2, J1, J3, J4 | BNC |
| 31 | 2 | C4, C5 | 2700pF DM |
| 32 | 1 | R5 | 1K OHMS |
| 33 | 1 | C9 | 20pF DM |
| 34 | 2 | R6, R7 | 510 OHMS |
| 35 | 1 | U2 | IDT7201LA50P |
| 36 | 1 | U13 | 74LS08 |
| 37 | 1 | U30 | 74LS20 |
| 38 | 1 | U45 | 74LS00 |
| 39 | 1 | U46 | 74LS10 |
| 40 | 1 | U10 | 74LS32 |
| 41 | 1 | U1 | AM7968 |
| 42 | 1 | U11 | A447-0100-02 (100nS DELAY LINE) |
| 43 | 4 | U5, U17, U18, U35 | VT2131-15 |
| 44 | 2 | U50, U39 | 74LS245 |

OBLIVIOUS MEMORY COMPUTER NETWORKING

BACKGROUND OF THE INVENTION

1. Field of the Invention

The invention relates to a data processing system utilizing an oblivious RAM that enables high speed transmission between substantially free-standing heterogeneous, geographically remote data processing equipment.

2. Description of the Related Art

The purpose of using a high performance computer network is to access data stored on remote machines as if it were stored locally. In particular, the time needed to access remote data should be nearly the same as the main memory (local data) access time. The two main obstacles that have historically confronted computer engineers are (1) the difficulty of fast data transmission, and (2) geographic separation. These obstacles must be simultaneously overcome to allow remote memory to perform like main memory. Local and remote data are accessed in two basic ways. The data may be (1) read from memory or (2) written to memory. In the hardware of the prior art a remote data access (read/write) is typically a two stage process starting with the operation initialization signal (or set of signals) and finishing with an operation completion signal set. Between these two stages, the prior art requires that the initialization signals travel from the source to the target and the completion signals return from the target to the source. Since read and write operations are indivisible (atomic processor operations that cannot be partially executed), the machine is not available for any other processing while the signals move back and forth. Both electrical and lightwave signals move very rapidly, even over relatively long distances. But, such transmission speeds (necessarily bounded by the speed of light) are considered slow compared to the transmission speeds needed by both current conventional and future high-performance data processing equipment. For example, in one nanosecond, the fastest signal possible, light, can move no more than one foot. Processors that can execute one instruction every 30 nanoseconds are relatively common. For any such processor to execute a stream of instructions, without interruption and using the prior art, all the data to be operated on must be within 30 feet of the processor. With prior art technologies, as processors get faster their data sources will have to be closer to the processor. Soon, the physical volume of the data source itself will limit the speed of the nearby processor. In summary, prior art computer networks either rapidly transmit data over short distances or slowly transmit data over long distances, but they cannot do both.

U.S. Pat. No. 3,771,137 discloses a design of a monolithic multiprocessor unit. This design insures that the local memories of the respective communicating computers are always coherent. Hence, an update of a single shared location requires waiting for either cache invalidation signals or cache update signal to travel to all the other processors. The disclosure involves systems expected to run processing elements separated by no more than a few feet. Signal propagation delay attendant with widely separated computers is not addressed in this disclosure. Nor does this disclosure discuss the problems associated with the use of heterogeneous computers, or the use of available wiring or reliable distributed performance.

U.S. Pat. No. 4,212,057 discloses a shared memory multi-processor system. The disclosure provides for the use of a single memory residing on a single machine that is shared between a multiplicity of processors. The design requires that the single shared memory send wait signals back to the communicating processor. Since memory physically resides in only one machine, this design cannot connect communicating processors with even modest lengths of cable without making provisions for signal propagation delay. When a remote access is in progress a wait signal is sent from the remote processor to the local processor. On a remote access, the wait signal performs a complex two-fold role. On the local machine, the wait signal informs the bus that although the current operation is slower than normal, the hardware is still operating correctly. On the remote machine, the wait signal is used to ensure serialized access to the memory. In other words, wait signals prevent collision between memory accesses that could result in lost or incorrect data. During the wait signal time, the local processor remains idle. While computers using a shared memory will, in general, communicate faster than machines not using shared memory, the speed of transmission of each datum is still proportional to the signal propagation delay due to the introduction of wait states. In some cases, high latency data transmission speeds may be slowed, relative to local memory access, by up to a factor of 1000.

U.S. Pat. No. 4,543,627 discloses a computer network that employs intelligent front-end interface processors. The intelligent processing cannot, in general, overcome the physical constraint of signal propagation delay or network latency.

The following U.S. Pat. Nos. are considered of possible general interest to the application: 3,581,291, 4,118,771, 4,181,935, 4,212,057, 4,213,177, 4,215,398, 4,223,380, 4,256,926, 4,371,929, 4,400,775, 4,410,994, 4,414,620, 4,445,174, 4,471,427, 4,503,496, 4,504,902, 4,504,906, 4,577,273, 4,591,977, 4,703,421.

SUMMARY OF THE INVENTION

Briefly described, the invention comprises a multiplicity of memories each installed in a free standing data processing system, connected by some transmission media, one memory in each machine, to implement a high transmission speed—long distance data communication link. The invention's multiple memories perform in unison as an oblivious memory. An oblivious memory system of communicating constituent memories allows the possibility that various memory components may respond differently to identical memory requests. Oblivious memory, when viewed as a shared memory, may become inconsistent. Furthermore, it is possible and, in fact, probable that the oblivious memory will always be inconsistent, however, its users will never be aware of this fact. With software to insure synchronization (or periodic waiting for data transmission completion)—a length of time proportional to the network latency—oblivious memory will always appear to be functionally consistent to the user. Oblivious memory transmits data between asynchronously operating computer systems by repeating memory write (storage of a single byte or word of information) commands over a transmission line. The source of the write command completes its write cycle immediately after repeating its write command over the transmission media. The receiver of the repeated write commands accumulates them in a queue from where they will be written to memory. As a result, the invention displays four properties: (1) the invention transmits data at rates equal to memory transfer rates; (2) the invention uses any available data transmission media technology; (3) the invention hardware is oblivious to signal propagation delays and/or network latency; and (4) the execution of some sequences of write commands may cause the oblivious memory to reach an inconsistent or incoherent state.

These and other features of the invention will be more fully understood by reference to the following drawings.

BRIEF DESCRIPTION OF THE DRAWINGS

FIG. 1A illustrates a signal timing diagram of the read cycle according to the prior art.

FIG. 1B illustrates a signal timing diagram of the read cycle according to the invention.

FIG. 3 illustrates a sequence of signal transmissions that result in oblivious memory incoherence.

FIG. 4 illustrates the differences in the transmission of a ten byte buffer between the prior art and the invention.

FIGS. 6 and 6A–6D illustrate the routing of data and control signals in a logical view of the invention embodiment of FIG. 5.

FIGS. 7 and 7A–7F illustrate a complete logic schematic of the system bus interface module.

FIG. 8 lists the logic equations used to burn the PALs.

FIGS. 9 and 9A–9D illustrate a complete logic schematic of the memory module.

FIGS. 10 and 10A–10D illustrate a complete logic schematic of the data transmitter module.

FIGS. 11 and 11A–11D illustrate complete logic schematic of the data receiver module.

FIG. 13 illustrates a list of standard parts used in the construction of the embodiment illustrated in FIG. 5.

DETAILED DESCRIPTION OF THE INVENTION

Figure 2A:
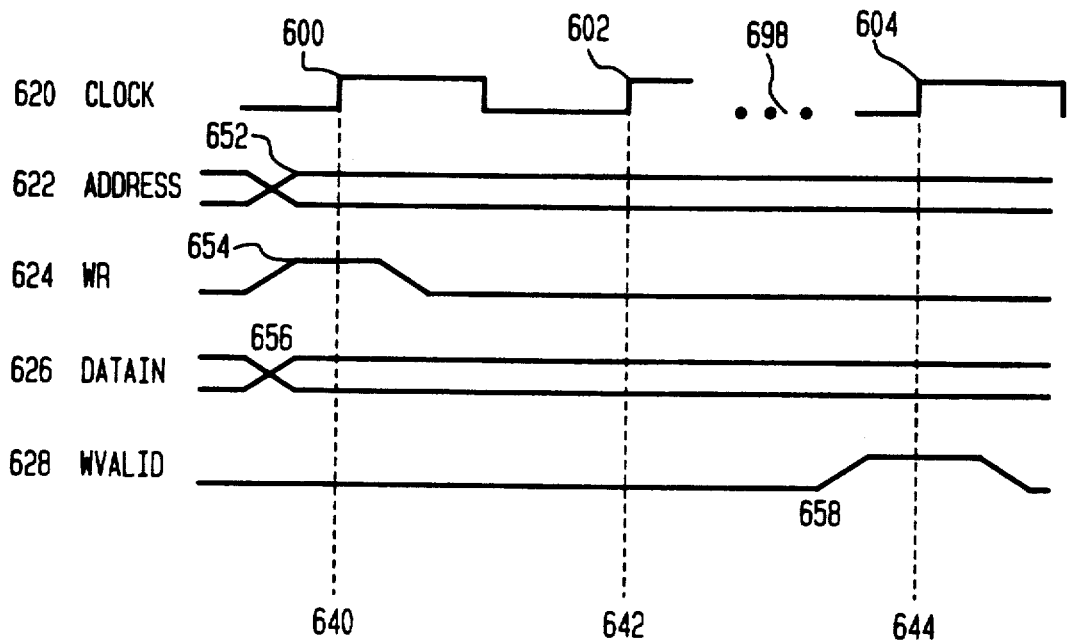
FIG. 2A illustrates a signal timing diagram of the write cycle according to the prior art.

During the course of this description like numbers will be used to identify like elements according to the different views that illustrate the invention.

The invention comprises an open architecture, high speed, heterogeneous, memory level computer network link. Each of the constituent computers possess their own address space and may be designed for different computer architectures, run different operating systems, and exist in geographical isolation. The individual network computer systems allocate a portion of their address space to be used as oblivious memory. Each memory address corresponds with physical memory chips supplied with the invention hardware. Each of the designated memory addresses is special because their write commands are repeated to multiple computer systems on the network. Depending on the application, the oblivious memory write commands are only be repeated to one neighboring computer system or broadcast to the entire network of computer systems. It is a function of the data switch connecting the invention embodiments to control the write command repetition or rebroadcast.

All computer memory, including oblivious memory, is accessed using two commands: read(memory location) and write(memory location, value). A read of a memory location returns the string of bits stored at that location. A string of bits is commonly called a value. A write of a value to a memory location causes the string of bits associated with the value to be stored at the memory location. The read cycle is the series of hardware signal alterations that result from the execution of a read command. Similarly, a write cycle is the sequence of hardware signal alterations that result from the execution of a write command. Two machines use the invention to communicate by reading and writing to their local oblivious memory. There are no other commands that effect data transmission other than read and write. Hence, the invention's data transfer capabilities may be completely understood by examining how it performs a read command and a write command.

In performing reads and writes, the invention demonstrates a unique feature, namely that all read and write commands are fulfilled locally. That is, all memory references, whether they are intended to change remote or local memory values, are satisfied exclusively from local memory. Thus, even if the local memory contains stale or incorrect data due to the oblivious memory being inconsistent, the invention hardware can only use the local memory. Read and write commands become much more efficient although occasionally inconsistent. Furthermore, an incoherency error can be avoided by the appropriate software.

When measured against a remote read command of the prior art, the efficiency of the invention read command is demonstrated. The invention reads the oblivious memory location on the next clock cycle while the prior art remote read sends the read command to the remote memory and must wait for a response. Here, the invention is faster because it does not need to wait.

Comparison of the write command in the invention and the prior art provides similar results. Since the invention writes to local memory and simultaneously shouts its write command to the network, it is substantially faster than a prior art write command that writes remotely and then waits for a write acknowledgement. FIGS. 1 and 2 explain the gains in efficiency more explicitly.

FIG. 1A illustrates a remote read cycle showing the sequence of signals seen over time on the system bus in the prior art. FIG. 1A shows the availability of valid ADDRESS signals 522 and a high read enable signal RD 524 at times 552 and 554 respectively. On the first rising edge 500 of the CLOCK signal 520, ADDRESS 522 and RD 524 signals are saved or latched. The prior art hardware then waits for RVALID 528 to go high indicating that the requested remote data is available. The remote data may be available by time 542 if the data is only a few feet away. In general the remote data will not become available until time 544 because of network latency. The time difference between time 542 and time 544 being an integral number 598 of CLOCK cycles 520. On the first rising edge of the CLOCK signal 520 after the assertion of the RVALID signal 528, at time 558, the requested remote data is guaranteed to be available on DATAOUT signal lines 526.

In the event that data is stored more than a few feet away, prior art systems introduce bus (hardware) wait states (i.e., inform the bus that it must wait for the remote data to arrive). During this waiting period there cannot be any activity on the bus since the read cycle has yet to be completed (a read command is an atomic command for the processor—it is either executed to completion or it is entirely ignored). The length of waiting period 598 is proportional to the time required for the data signals to travel from the remote system to the local system. Processing cannot continue during this delay since the processor is also awaiting the completion of an atomic read command. Waiting period 598 may be as long as 1 second—an eternity for a high performance data processor. A processor remaining idle for 1 second may be missing the opportunity to execute 10,000,000 instructions. To summarize, in the prior art, both the bus and the processor wait for remote data signals to move from one physical location to another.

FIG. 1B shows the availability of valid ADDRESS signals 532 and a high read enable signal RD 534 at times 560 and 562 respectively according to the invention. On the first rising edge 506 of CLOCK signal 530, ADDRESS 532 and RD 534 signals are saved or latched. The invention waits one CLOCK cycle 530, or until the next rising edge of CLOCK 508, for RVALID 538 to go high indicating that the requested data is available. DATAOUT signals 536 are valid by time 548. One CLOCK cycle 530 is the time difference between 548 and 546. The invention's read cycle requires one CLOCK cycle 530 to complete since the data is always assumed to be stored locally.

Prior art shared memory technology such as that disclosed in U.S. Pat. No. 4,212,057 have two kinds of read cycles (since there is only one single memory that is shared). The first kind is a local read cycle that corresponds to the situation when data that is available locally as shown in FIG. 1B. The second kind of read cycle is the remote read cycle. This cycle is executed when the required data is not stored locally. This second prior art read cycle is as shown in FIG. 1A.

The prior art technology, shown in FIG. 1A, requires both the processor and the bus to wait for a time period corresponding to 598+1 CLOCK cycles 520 for the remote data to arrive whereas the invention, shown in FIG. 1B, needs only 1 CLOCK cycle 530 before completing any read request. To summarize, the invention enables the bus and processor to wait for only one CLOCK cycle 530, the minimum possible time, for either local or remote data.

FIG. 2A illustrates the system bus signals required by the prior art write to store data, available locally on the DATAIN lines 626, to a remote memory location specified by the ADDRESS lines 622. FIG. 2A shows the availability of valid ADDRESS signals 622, DATAIN signals 626, and a high write enable signal WR 624 at times 652, 656, and 654 respectively. On the first rising edge 600 of the CLOCK signal 620, ADDRESS 622, DATAIN 626, and WR 624 signals are saved or latched. The prior art hardware then waits for WVALID 628 to go high 658 indicating that the write has successfully completed. If the remote storage is only a few feet away, the write may be completed as early as time 642. In general, the write will not complete until time 644 because of signal propagation delays. An integral number 698 of CLOCK 620 cycles is the time difference between 642 and 644. On the first rising edge of CLOCK signal 620 after the assertion of the WVALID signal 628 at time 658 the requested remote write is guaranteed to have been completed.

In the event that storage more than a few feet away, all prior art systems must introduce bus (hardware) wait states to inform the bus that it must wait for confirmation of a correct write instruction execution (i.e.,WVALID). During this waiting period there cannot be any activity on the bus since the write cycle has yet to be completed (like the read command, the write command is atomic). The length of waiting period 698 is proportional to the time required for the address and data signals to travel from the local system to the remote system. Processing cannot continue during this delay since the processor is also awaiting the completion of an atomic write command. It is in the middle of executing a single atomic command. To summarize, in the read and write commands of the prior art, both the bus and the processor wait for remote data signals to move from one physical location to another. The invention's read and write commands never wait.

Figure 2B:
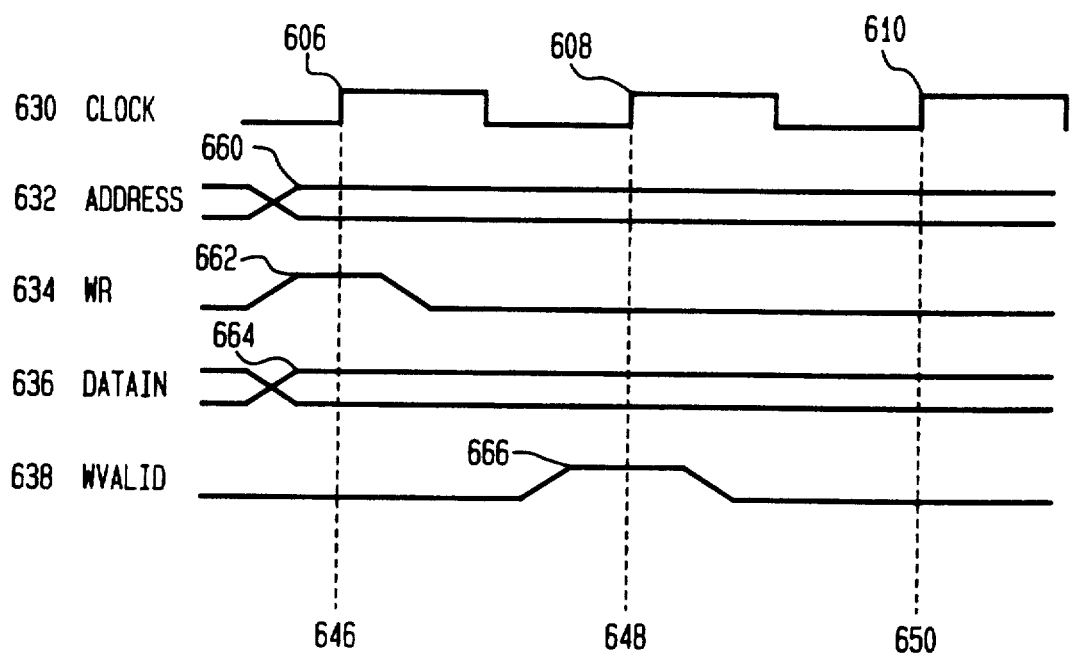
FIG. 2B illustrates a signal timing diagram of the write cycle according to the invention.

FIG. 2B shows the availability of valid ADDRESS signals 632, DATAIN signals 636, and a high write enable signal WR 634 at times 660, 664, and 662 respectively according to a write command of the invention. On the first rising edge 606 of CLOCK signal 630, ADDRESS 632, DATAIN 636, and WR 634 signals are saved or latched. The invention waits one CLOCK cycle 630, or until the next rising edge at time 608, for WVALID 638 to go high indicating that the write has completed. WVALID 638 signal is valid by time 648. The time difference between 648 and 646 is one CLOCK cycle 630. The invention's write cycle requires 1 CLOCK cycle to complete since the data stored locally.

The prior art technology, as shown in FIG. 2A, requires both the processor and the bus to wait for 698+1 CLOCK cycles 620 for a write command completion signal whereas the invention, as shown in FIG. 2B, needs only 1 CLOCK cycle 630 before completing any write request. A processor using the invention can write a single byte and execute 10,000,000 instructions in the time required for some prior art systems to write a single byte to a remote system.

FIG. 3 illustrates how the oblivious memory according to the invention may become inconsistent. The read and write commands are assumed to take one time unit to complete. The signal propagation delay time d, for the purposes of this example, is greater than five time units (in general d may be up to 10,000 time units or more). A write of the value 77 to oblivious memory location 1000 (i.e., write(1000, 77)) on machine A causes: (1) a bit string representing the value 77 to be stored in memory address space location 1000 on machine A during the next write cycle, and (2) the repetition of the write(1000,77) command over the transmission line connecting machines A and B. After a period of d time units, corresponding to the signal propagation delay, the write(1000,77) command will arrive at a queue in the invention installed in machine B. The invention will write the bit string associated with the value 77 in the oblivious memory location (in machine B) 1000 during the next write cycle. Thus d time units after a remote write in oblivious memory the data becomes available locally.

If machine A has a message to pass to machine B that cannot be encoded in a single byte then A simply writes the message into an oblivious memory buffer. Such a buffer (a multiplicity of bytes or memory words) (for this example of size 1000 bytes) would be filled by executing 1000 write commands. As machine A writes each byte into the oblivious memory buffer, each byte is repeated into a corresponding oblivious memory buffer in machine B. Machine A communicates with machine B by writing into its local oblivious memory. Machine B communicates with machine A by writing into its local oblivious memory.

Execution of two write commands, one issued by machine A at time t and one issued by machine B at time t+2, cause the oblivious memory to become inconsistent. The write to location 1000 of the value 20 executed by processor A at time t is the first command; and the write to location 1000 of the value 77 by processor B at time t+2 is the second command. "Read memory location 1000" commands are included to display the contents of the Oblivious Memory. There is a delay of d time units before repeated write commands arrive at their destination. This delay corresponds to the network latency. The important feature of this illustration is that, in the absence of further writes to location 1000, the Oblivious Memories of machines A and B will always have different contents at location 1000.

FIG. 4 illustrates the difference between the transmission of a 10 byte buffer in the invention and the prior art. The invention carries data between machines A and B in oblivious memory while a prior art network connection transmits data between machines C and D through shared memory (where machine D contains the memory). For the purpose of the example, the signal propagation time is 6 time units. However, in practice, the signal propagation time may be as large as 10,000 units.

A single time unit is required for the invention's read or a write command. Similarly a local read or write on the prior art system requires a single time unit. A remote read or write on the prior art system requires 1 time unit plus 6 time units for the signal delay for a total of 7 time units. In this example, buffer transfer software runs on both the invention and the prior art system. The buffer transfer software assumes that location 100 is a flag for which the value 0 means "receiver reads" and the value 1 means "transmitter writes." If the value of the flag is 0 then the transmitter will not write. If the value of the flag is 1 then the receiver will not read. In this example, machines A and C are the transmitters. Machines B and D are the receivers. The buffer transfer software assumes that there is a memory buffer at memory location 250 of length at least 10 locations. Each table entry indicates other than time either (1) a command, (2) "−" idle time, (3) "+" time available for other processing, or (4) "." no entry. Machine A initiates the buffer transfer at time t knowing that at some previous time the flag has been set to 1. Given that it is the transmitter's turn to write, machine A will write an element of the buffer each time unit until the list is exhausted. Thus A will execute buffer write commands for each time unit from t until t+9. At time t+10, machine A will write a zero to oblivious memory location 100 to indicate to machine B that it is the receiver's turn to read data. After t+10 all of machine A's processing power can be used for another problem.

Machine B simply watches the flag location for the value zero. "Watching" in this case is equivalent to reading local memory on each cycle. When at time t+17 (machine A wrote the value at t+10 and there are 6 units of delay between machines A and B) machine B first reads the value zero from location 100 (designated with a star "*") machine B begins to read the data from the buffer starting at the next time unit t+18. For each time unit in the interval t+18 to t+27 machine B reads another value of the buffer. After t+27, machine B has completed reading the buffer and is available for other processing. More generally after t+27 the invention has completed the buffer transfer program.

Machine C, like machine A begins executing the buffer transfer program with the flag at location 100 set to one. Unlike machine A, machine C must execute all communication writes remotely since, in this example, machine D contains the shared memory (and only one machine may contain shared memory). Thus machine C writes the first byte into location 250 at time t but cannot write the second byte into location 251 until time t+7. In fact machine C will not complete writing the buffer contents until t+63 since there are 6 units of delay between machines A and B. Then at t+70 machine C will transfer control to machine D by setting the flag at location 100 to zero. At t+70 machine C will be able to perform other computations. Seven time units later, at time t+77 machine D, will see the flag switch and begin to read the data from the buffer. Machine D will then complete reading the data 10 time units later at time t+87.

The point is, comparing the transmitting machines A and C, using the invention saved 60 time units in this example. Processor A was 7 times more efficient than Processor C. Comparing the receiving machines B and D, reveals that Processor B was done 60 time units before Processor D. Processor B was 3 times more efficient than Processor D.

FIG. 4 illustrates how the invention can pipeline remote operations. The pipeline effect is analogous to increasing the rate of manufacturing automobiles using assembling line techniques. If a single car takes two days to build, then large numbers of automobiles can be produced by building cars incrementally as they pass down an assembly line. The invention uses a similar concept in transmitting data buffers incrementally as they pass through a long transmission line. In fact, this assembly line approach works for both sending and receiving data.

FIG. 3 as described earlier showed how two machines can reach an inconsistent state using the invention. The potential for inconsistency is unavoidable for a communications system that can take advantage of the pipeline efficiency mentioned above. In order to obtain the pipelined efficiency and avoid the potential for oblivious memory inconsistency, the software run on the invention must ensure that communication programs utilize flags (or equivalent structures such as processor interrupts) such as that used in the FIG. 4 buffer transfer program example.

An example of software that will run a double buffered speed test between machines A and B using flags to ensure that the oblivious memory behave consistently is as follows:

```
#include <stdio.h>
#include <time.h>
#include <stdlib.h>
#define BHAUL    900
#define MM       0x90000000L
```

-continued
```
#define MMA     MM
#define MMB     MM+BHAUL
main(argc,argv)
char    *argv[ ];
int     argc;
{
    in read=0, write=0;
    char *waita, *waitb, *mema, *memb;
    long stime, etime;
    long, c, cp, t, nbytes, tbytes, rn=0, wn=0, i, j, escape=0;
    /* check the number and type of args */
    if(argc != 3)
    {
        printf("Error: too many/few args\n");
        printf("Format: test <log(number of bytes)> <r/w>\n");
        return(0);
    }
    if ((c = atoi(argv{1})) > 10 || c < 0)
    {
        printf("Error: too many/few tytes specified\n");
        printf("Format: test <log(number of bytes)> <r/w>\n");
        return(0);
    }
    if(*argv[2] == 'r') = 1;
    else if(*argv[2] == 'w') write = 1;
    else
    {
        printf("Format: test <log(number of bytes)> <r/w>\n");
        return(0);
    }
    /* signals for buffering */
    waita = (char *)(MM+1999);
    waitb = (char *)(MM+1998);
    *waita = 0;
    *waitb = 0;
    /* number of buffers to be transferred */
    nbytes = 1;
    for(i=0; i < c; i++) nbytes *= 10;
    cp = nbytes/ BHAUL;
    /* memory to be moved */
    mema = memb = (char *) 0x50000000L;
    time(&stime);
    if(write) while(wn<cp) {
        while(*waita == 1);
        memcpy((char *)MMA, mema, BHAUL);
        *waita = 1;
        while(*waitb == 1);
        memcpy((char *) MMB, mema, BHAUL);
        *waitb = 1;
        wn += 2;
        if(escape++ > 10) {
            escape = 0;
            printf(".");
        }
    }
    else if (read) while(*waita != 2 && *waitb != 2) {
        while(!*waita);
        memcpy(memb,(char *)MMA,BHAUL);
        if(*waita != 2) *waita = 0;
        while(!*waitb);
        memcpy(memb,(char *)MMB,BHAUL);
        if(*waitb != 2)*waitb = 0;
        rn += 2;
        if(escape++ > 10) {
            escape = 0;
            printf(".");
        }
    }
    else printf(" process neither reading nor writing\n");
    /* show that the write is done */
    if(write)
    {
        while(*waita == 1 || *waitb == 1);
        *waita = *waitb = 2;
    }
    time(&etime);
```

-continued
```
    t = etime - stime;
    if(!t) t=1;
    tbytes = (rn + wn) * (long)BHAUL;

printf("r/w %ld bytes at %d K bps\n",
        tbytes, tbytes/(t*1000))
    return(1);
}
```

The software that communicates through oblivious memory cannot be the same as the software that runs on the prior art systems. In all prior art systems the hardware ensured that the shared memory was always consistent. With the invention, the synchronization software must ensure that machines take turns writing to the oblivious memory.

The invention transmits short messages by sending only address and message bytes over the cable. The actual availability of the transmitted data depends only on the cable speed, the cable length, the memory speed used to implement the invention, and the interface card-logic speed used in the invention's embodiment.

Figure 5:
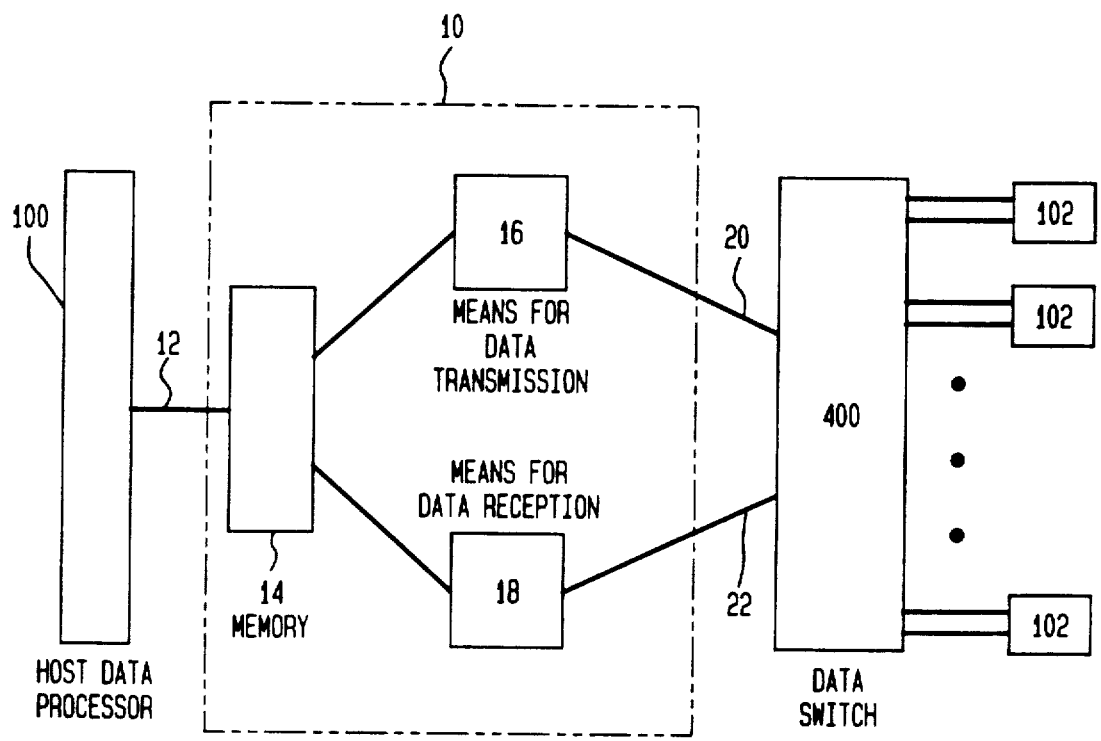
FIG. 5 illustrates an embodiment of the invention in the two-way communication mode connected to a host data processor and a data switch.

FIG. 5 shows the preferred embodiment of the invention 10 in a multi-way oblivious memory communication system. The invention 10 is composed of six elements: memory 14, a system bus interface 12, a means for data transmission 16, a means for data reception 18, a transmission line 20, and a reception line 22. The invention 10 communicates between host data processor 100 and data network switch 400. Transmission line 20 and reception line 22 can be any of a variety of transmission media such as, coaxial cable, twisted pair, fiber, radio, satellite, microwave, and CATV. Given the appropriate multiplexing logic, transmission line 20 and reception line 22 may be the same physical transmission media. Data network switch 400 is responsible for routing the repeated write commands from the means for data transmission 16 to the appropriate machine's means for data reception 18 similarly connected to switch 400. When invention 10 repeats a write command, it does so only once, switch 400 is responsible for repeating multiple copies. A variety of data switches including the telephone system can be used to connect invention embodiments. One skilled in the art will be able to select an appropriate data switch. There is no particular maximum number of invention embodiments that can be simultaneously connected to the switch. As the number grows the switch will become saturated but invention 10 hardware will continue to function at full speed.

If invention 10 is to be used exclusively for data transmission, then means for data reception 18 and reception line 22 can be omitted. Similarly, if invention 10 is to be used exclusively for data reception, the means for data transmission 16 and transmission line 20 can be omitted. An embodiment of the invention containing all of the six elements for data transmission is capable of full two way communication through data switch 400. Observe that data switch 400 may be absent, in which case invention 10 may be connected directly to another corresponding version of invention 10.

Switch 400 repeats the single write command issued by the means for data transmission 16 to all the other connected components. Thereby, all the machines connected to switch 400 have access to a single oblivious memory. Connections to additional switches from data switch 400 are also possible.

Host data processor 100 may be any machine that can access memory or communicate with invention 10's memory through system bus interface 12. In some cases, the system bus may be replaced by a communication port.

FIGS. 6 through FIG. 12 represent all the logic needed to build the preferred embodiment illustrated in FIG. 5.

FIGS. 6A–6D illustrate the flow of data and control signals between logical modules for the embodiment of the invention rendered in FIG. 5. The subsequent figures, FIG. 7 through FIG. 12, are the detailed logic schematics of the modules illustrated in the Logic Block Diagram FIGS. 6A–6D. FIG. 13 lists the parts, where like numbers represent like parts, needed for the construction of the preferred embodiment of FIG. 5.

For the purpose of description of the operation of the logic in invention 10, the generic configuration illustrated in FIG. 5 is described in detail. A different configuration would require a corresponding adaption of the logic depicted. The local system is host processor 100 and the remote is processor 102.

The logic block diagram presented in FIGS. 6A–6D illustrate the distribution of data, address, and control signals in the oblivious memory of invention 10 in FIG. 5. There are nine modules that will be discussed: the four bus connection modules 24, 26, 28, and 30; bus interface module 12; memory module 14; buffer module 36; data transmission module 16; and data receiving module 18. The four bus connection modules ar renderings of standard bus connectors commonly accessible on open architecture data processing systems. Their operation is completely specified by showing what signals are connected to which pins. Different open architectures can use different busses which might result in a different set of signals or a different number of signals being available through another set connectors.

The number, type, size of the connectors may vary between different bus types without significantly altering the effect of the invention. The remaining modules are more complex and will be described in detail in this disclosure. Of these three modules, bus interface module 12 and the buffer module 36 utilize standard technology in a standard fashion familiar to those of ordinary skill in the art. Memory module 14, data transmission module 16, and data receiver module 18 again use standard technology but in a novel configuration unique to invention 10.

The system bus connection modules labeled 24, 26, 28, and 30 in FIG. 6 contain all the pins that are available through the IBM PC/AT bus channel connectors. The A connector 24 module carries two busses, the system address bus (SA) and the system data bus (SD), as well as two signals, AEN and IOCHRDY, from the system bus to the System Bus Interface Module 12. Pins A31 through A15 carry, host processor 100 generated, signals SA0 through SA16 which are used to address memory devices on or attached to invention 10.

This system address bus, in addition to being connected to the System Bus Interface Module 12, is also connected to memory module 14 and transmitter module 16. The SA ("System Address") signals are gaited on the system bus when "BALE" (the signal coming in 26 on pin B28) is high and are latched on the falling edge of "BALE." Signal AEN coming in from the A connector 24 on pin A11 is named "Address Enable." AEN is used to degate host processor 100 and other devices from the system bus to allow DMA transfers to take place.

There are 16—SD signals that invention 10 utilizes as a system data bus. The first 8 of these signals SD0 through SD7 come from the A connector 24 module through pins A9 through A2. The remaining 8 SD signals SD8 through SD15 come from pins C11 through C18 of the C connector 28 module. The SD signals provide 16 bits of data for host processor 100 and invention 10. The SD signals, otherwise known as the data bus, are routed to both system bus interface module 12 and buffer module 36.

B Connector 26 provides connections to power (through pins B29 and B3) and ground (through pins B31 and B10) as well as control signals BALE, RESET DRV, INT9, IOR, and IOW. Like A Connector 24, B Connector 26 connects the bus signals to system bus interface module 12. BALE or "address latch enable" is provided through pin B28 to latch valid addresses and memory decodes from host processor 100. It is available to the bus as an indicator of a valid address. BALE signal is to be used in conjunction with the AEN and SA signals from A Connector 24. RESET DRV or "Reset Drive" is available through pin B2. RESET DRV is used to reset or initialize system logic at power-up time or during low line-voltage outage. INT9 signal produced by system bus interface module 12 available to pin B4 represents the highest priority of level system interrupt that can be used to signal host processor 100.

An interrupt request is generated when an INT line is raised from low to high. INT line must be held high until host processor 100 acknowledges the interrupt request. IOR signal (also called the "I/O Read" signal), generated by host processor 100 and available through pin B14, instructs the invention 10 to drive its data on to the SD lines of A Connector 24 and C Connector 28. IOR or I/O Read signal available from pin B14 instructs invention 10 to read data from the data bus (SD). A corresponding signal IOW (also called the "I/O Write" signal) is generated by host processor 100 and made available through pin B13. IOW instructs invention 10 to write data on the data bus (SD) through A Connector 24 and C Connector 28.

C Connector 28 provides connections between the system bus and system bus interface module 12 for 8 of the SD (system data bus) signals as well as LA17-23, SBHE (is also connected straight through to the data transmission module), MEMW, and MEMR signals. Signals SD8 through SD15, available through pins C11 through C18, form the upper byte of the SD system data bus. Signals LA17 through LA23 are available through pins C8 through C2.

The unlatched signals provide additional addressing capabilities to those provided by the SA signals originating from the A Connector 24. LA signals are valid when BALE is high. The LA signals are not latched during microprocessor cycles and therefore do not stay valid for the whole cycle. SBHE or "Bus High Enable" signal is available through pin C1 and is used to indicate a data transfer on the upper 8 pins of the data bus (SD8 through SD15). Signal MEMW or "Memory Write," available through pin C9, instructs the invention 10 to store data available from the data bus. Signal MEMR or "Memory Read," available through pin C10, instructs invention 10 to drive data signals on to the data bus.

D Connector 30 provides connections for signals MEMCS16, IOCS16, INT10, INT11, and INT12 from the System Bus Interface Module 12 to the System Bus.

Signal MEMCS16, available to pin D1, signals host processor 100 if the current data transfer is a 1-wait state, 16-bit memory cycle. Signal IOCS16, available to pin D2, signals host processor 100 that the current transfer is a 16-bit, 1 wait-state, I/O cycle. Signals INT10, INT11, and INT12, available to pins D3 through D5, are additional interrupt lines for signalling host processor 100. INT10 has the highest priority and INT12 the lowest priority of these three interrupt lines.

In FIGS. 7A-7F, which illustrate system bus interface module 12, both the function of module 12 and signals used by module 12 will be described in detail. With the exception of SBHE, the system address bus (SA), and the system data bus (SD) signals, all of the invention's 10 signals from the system bus are filtered through interface module 12. Every signal described as coming from the Connector Modules 24, 26, 28, and 30 connects to system bus interface module 12. The purpose of this signal routing is to keep all the functions that relate to communication over a specific type of bus in one module. Few of the other invention modules need to know or function in a way that is dependent on the type of bus over which invention 10 is communicating.

Signals RAMCS1, RAMCS2, RDLO, RDHI, TERR, RESET, MEMI, WAIT, BDWR, WRLO, and WRHI are also produced or consumed by system bus interface module 12 and do not connect to one of the connector modules 24, 26, 28, or 30.

Signals RAMCS1 and RAMCS2 "Random Access Memory Chip Select" 1 and 2 are sent from interface module 12 to memory module 14 so that a particular memory device on invention 10 is enabled for selected activities. Signals RDLO and RDHI (Read Low Byte and Read High Byte) are sent to memory module 14 from interface module 12 when host processor 100 makes a read request from memory addresses that are mapped into the physical memory of memory module 14.

Since memory module 14 stores memory in 16 bit quantities and may be requested by host processor 100 in 8-bit quantities, bus interface module 12 must determine whether to send for the "LO" byte and/or the "HI" byte, hence the two signals. Signal TERR or "Transmission Error" is used to indicate either a hardware transmission error or a user generated exception. Signal TERR is passed from data receiver module 18 to interface module 12 where the nature of the error is determined. RESET signal, which is passed from interface module 12 to data transmitter module 16, is used to clear the state of the data multiplexing logic prior to sending real data. MEMI signal is used to pass memory mapped interrupts from memory module 14 to interface module 12. MEMI signal is asserted when a particular location in invention's 10 memory is written. In that event, the MEMI signal causes one of the interrupt lines INT9, INT10, INT11, or INT12 to be asserted thus causing an interrupt to be sent to host processor 100. WAIT signal along with the WRLO and WRHI signals are used to control IOCHRDY signal. BDWR (board write) signal is used to indicate that invention is prepared to write. Signals WRLO and WRHI (Write Low Byte and Write High Byte) are sent from interface module 12 to memory module 14 (just like RDLO and RDHI) and data transmitter module 16. WRLO and WRHI function in memory module 14 as switches that enable memory devices to capture data from the data bus through connectors 28 and 24 (SD signals) and store it in either the low byte and/or high byte of invention's 10 16-bit word physical memory.

Memory module 14 communicates with the interface module 12 over signals WRHI, WRLO, MEMI, RDHI, RDLO, RAMCS1, and RAMCS2. Memory module 14 uses the WRITE signal to communicate with the receiver module 18. When a write commands arrives from remote system 102, WRITE signal indicates the appropriate time to store the data in invention 10 memory.

Three buses communicate with memory module 14. The first bus connection is to the system address bus (signals SA0 through SA11) originating from the A Connector and connecting memory module 14 to both the system bus interface module 12 and transmitter module 16. The second bus connection is to the output bus (OB0 through OB31) that connects receiver module 18 with memory module 14. The third and last bus is the BD (signals BD0 through BD15) bus that connects buffer module 36 with memory module 14 and transmitter module 16. Memory module 14 receives system address and data signals via buffer module 36 from the connectors 24 and 28 over the SA0 through SA11 and SD0 through SD15 lines.

Two functions are performed by memory module 14—reading and writing. On a memory read from host processor 100 to invention 10 physical memory, SA0 through SA11 contain the address of the desired information; RDHI and RDLO determine which byte(s) of invention 10 physical memory are being requested; and RAMCS1 and RAMCS2 determine which memory device will respond to the read request. The read will be responded to by sending the requested data over SD0 through SD15.

A useful part of invention 10 is demonstrated in the write request cycle of host 100. Similar to the case of the read request: SA0 through SA11 along with WRLO and WRHI indicate the byte(s) of interest; RAMCS1 and RAMCS2 indicate invention 10 memory devices of interest; and SD0 through SD15 contain the data to be written. When the write is to be performed the contents of SD0 through SD15 are stored through buffer module 36 to memory module 14 memory and additionally an address and data signals are sent over BD (through 36) and SA to transmitter module 16.

A feature utilized by invention 10 is that host processor 100 completes the write cycle when 32 bits of data is driven on to transmitter module 16. What was not possible in the prior art was to allow host processor 100 to remain oblivious to the success or failure of an extended write cycle. If the 32 bits on the BD bus are garbled in transmission or are destroyed during remote host processor's 102 decoding, host processor 100 need never know.

A characteristic of all embodiments of invention 10 is that host processor 100 cannot know whether or not the extended write cycle was successful at the remote host 102 because local host 100 does not wait for a signal. Invention 10's utilization of the switch on queuing incoming network writes eliminates any serialization problems. Operating system software, running on host processor 100 and remote host processor 102, may watch for such conditions and use invention 10 to correct the situation, however, invention 10 is oblivious to the intent of the system software. Host processor's 100 write cycles distributed by invention 10 are absolutely undisturbed. From host processor's 100 point of view, invention 10 performs exactly like a local memory board.

Data transmission module 16 in FIG. 6A is the remote communications agent for memory module 14. Transmission module 16 is connected to two busses, BD and SA, as well as four signals, WAIT, RESET, SBHE, and BDWR. Data transmission module 16 receives 32-bits of data at a time in parallel with memory module 14 that in turn is to be sent to remote host processor 102. Inside data transmission module 16 the data taken from the BD and SA busses and is divided into 4–8-bit bytes. In turn, bytes are serially transmitted to remote machine 102 by data transmission module 16. The data contained in a four byte sequence includes control signals that allow remote machine 102 to perform decoding operations. Once invention 10 finishes sending the 32 bits of data, host processor's 100 "extended" write cycle is complete. The WAIT signal is released to system bus interface module 12 that allows the system bus to be informed that the write is completed. Host processor 100 does not expect or wait for acknowledgment of the receipt of the data from remote machine 102. Any transmission or synchronization errors are corrected in host processor 100 and remote processor 102 operating system software.

RESET signal is used to initialize multiplexing logic internal to data transmission module 16. BDWR is a signal from system bus interface module 12 that indicated invention 10's memory is active and ready to be written to. The system bus signal SBHE, when asserted, indicates that the data transfer is to be limited to the high eight bits of the system data bus (SD).

Data receiver module 18 in FIG. 6A has two signals, TERR and WRITE, and an output bus connection (OB0 through OB31). Data receiver module 18 must assemble signals from remote processor 102 and issue them for host processor 100 as data (OB bus) or as control signals (TERR or WRITE). TERR or "Transmission Error" is the signal sent from remote processor 102 through data receiver 18 to system bus interface module 12 indicating an exceptional condition that requires special processing by host processor 100. The output bus signals, OB0 through OB31, transmit incoming data signals from remote machine 102 that may be passed to memory module 14. Incoming data is parity checked and stored in memory module 14 if the parity check was successful. If the parity check failed, the TERR is raised informing host processor 100 a transmission error has occurred. In the event of an error of any kind that causes TERR to be raised, it is the system software that will take steps to correct the error—no steps of any kind will be taken under the initiative of the invention hardware to correct errors generating a TERR signal.

Figure 6B:
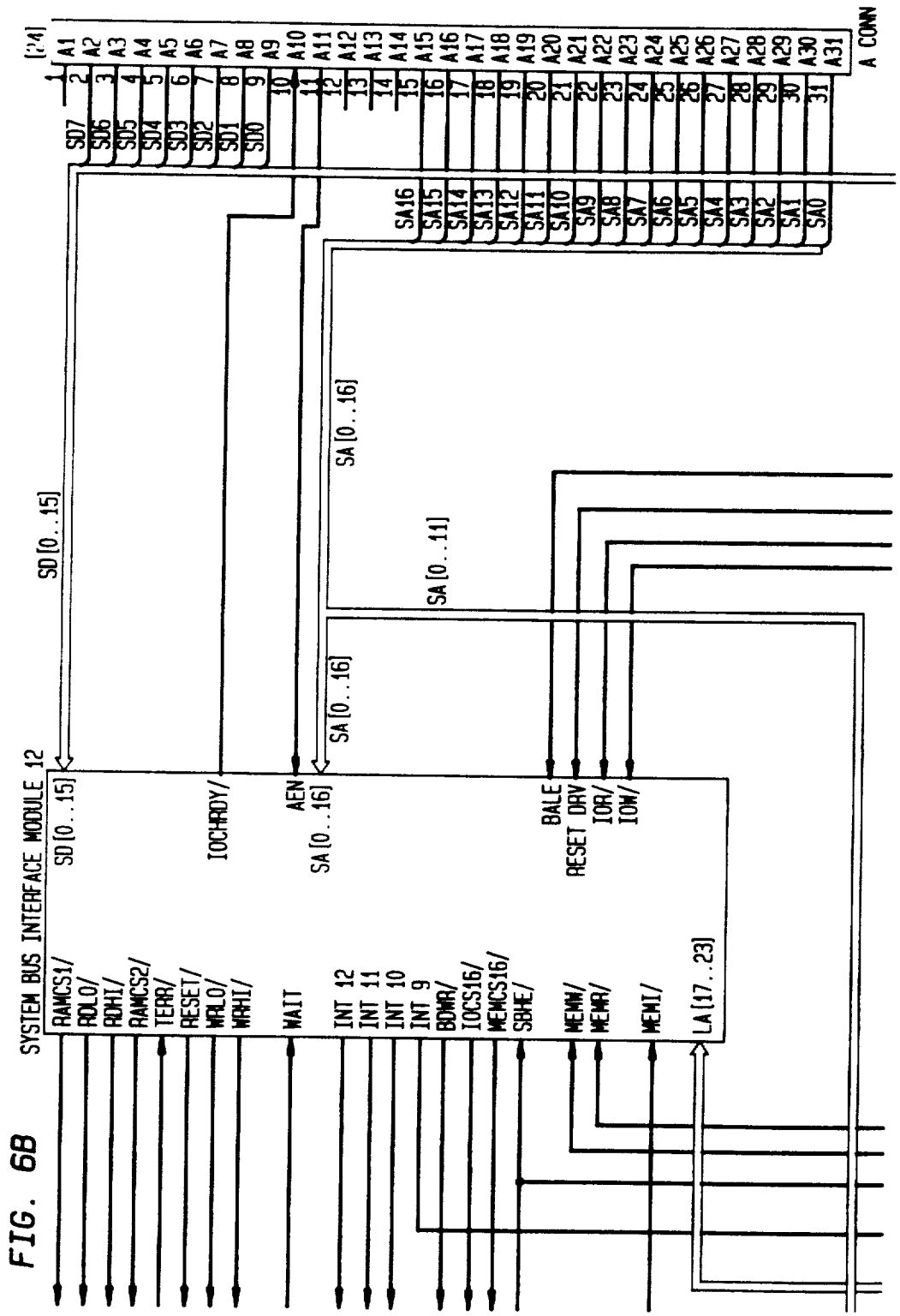
Figure 6C:
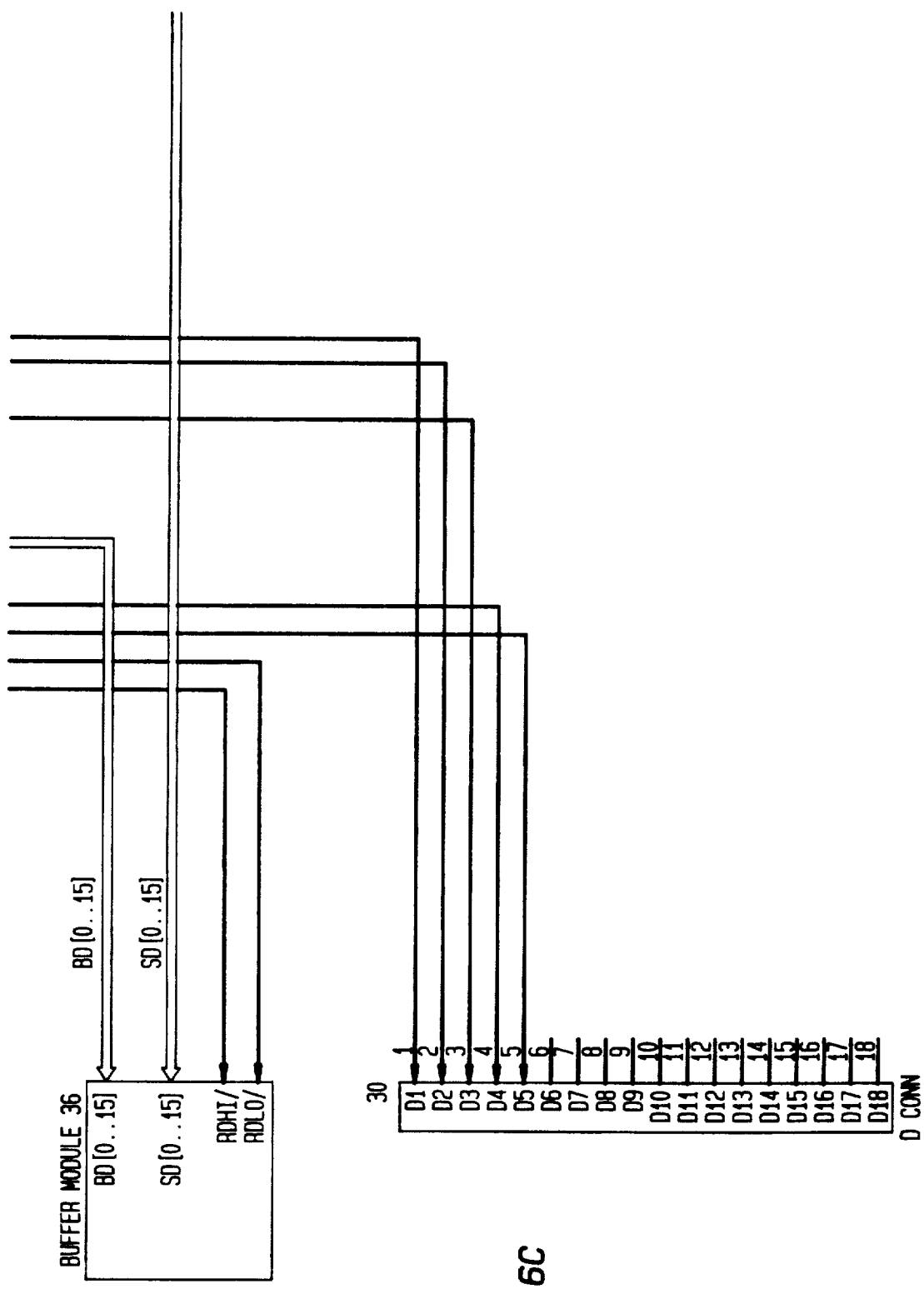
Figure 6D:
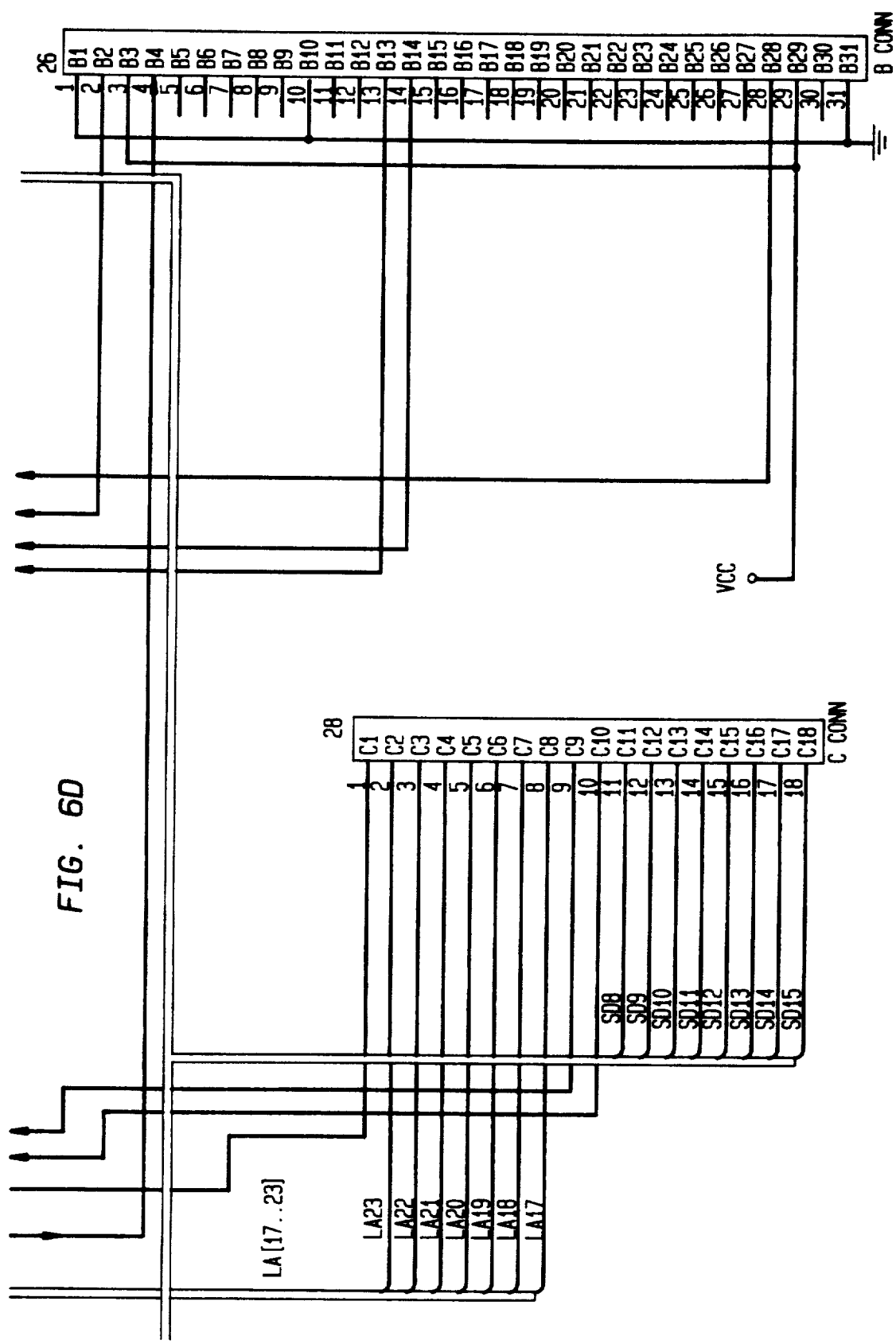
Figure 7B:
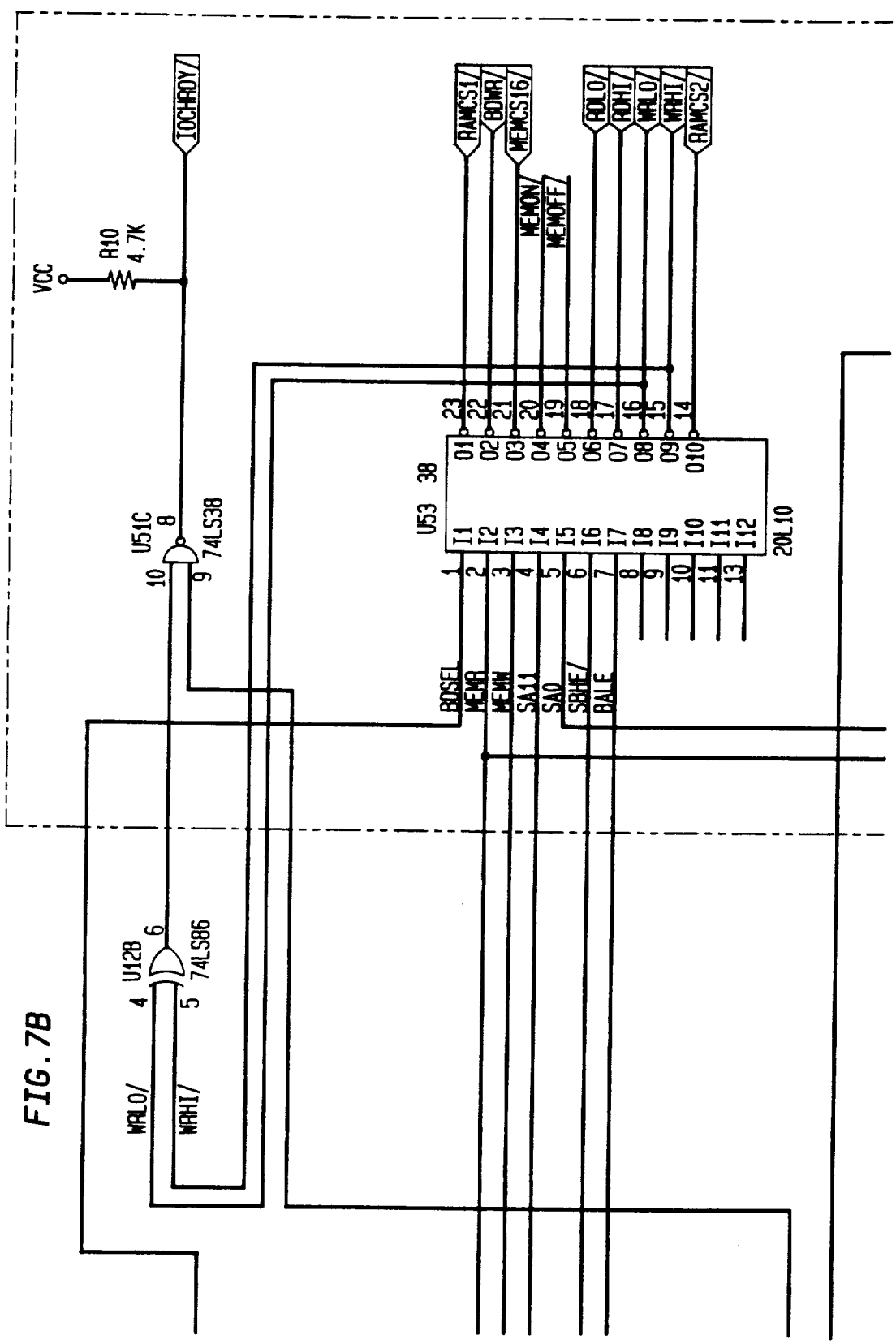
Figure 7C:
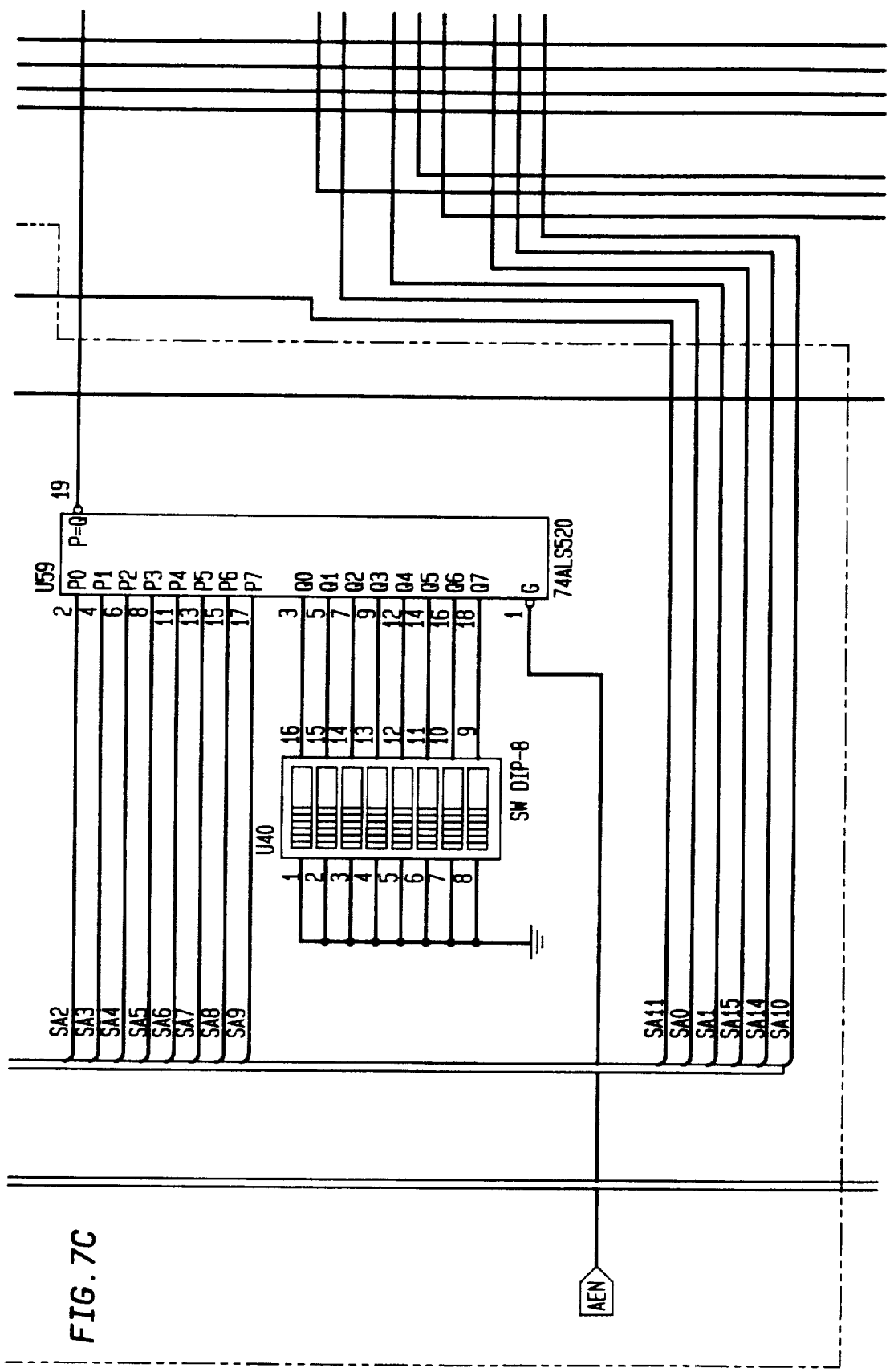
Figure 7D:
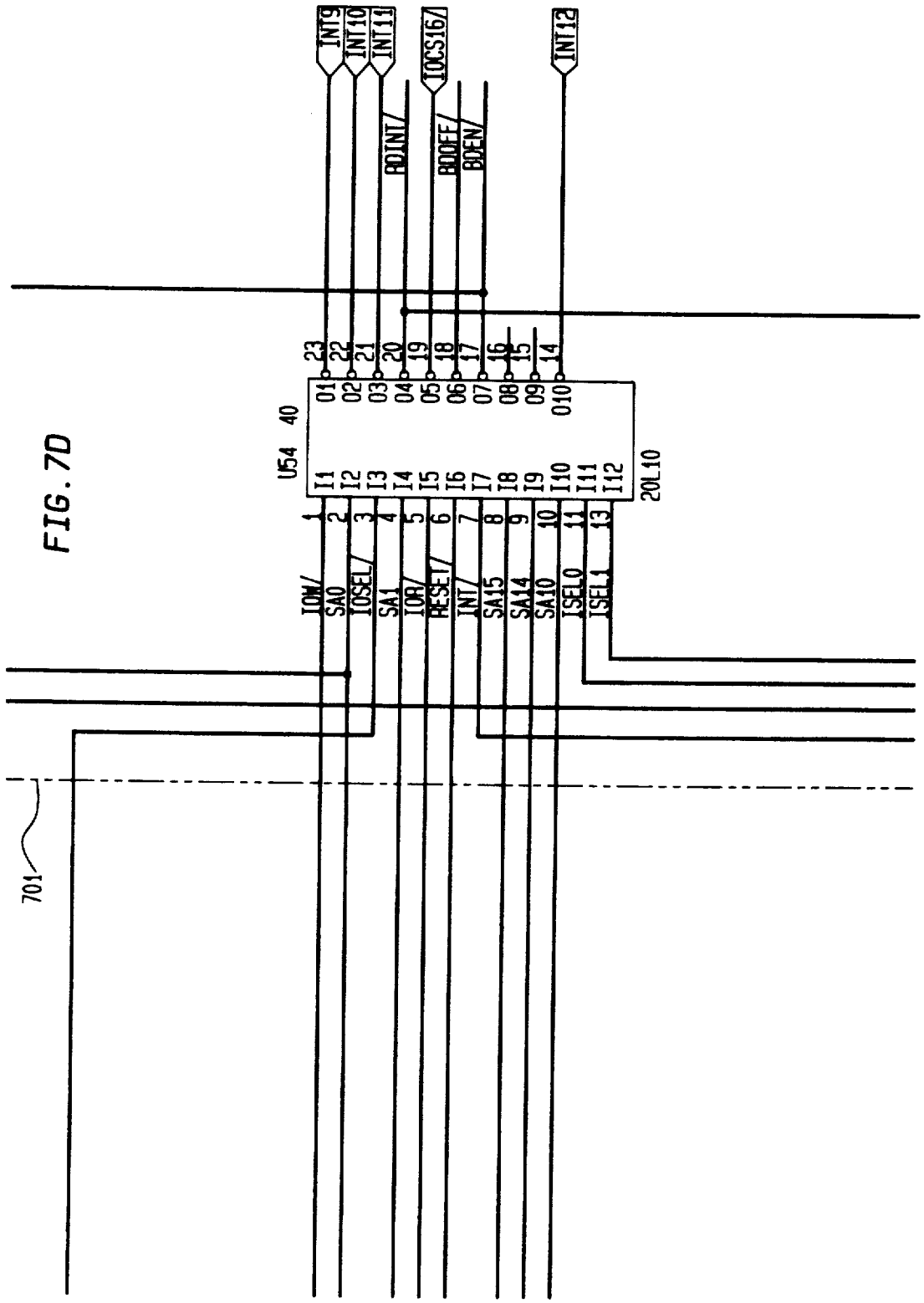
Figure 7F:
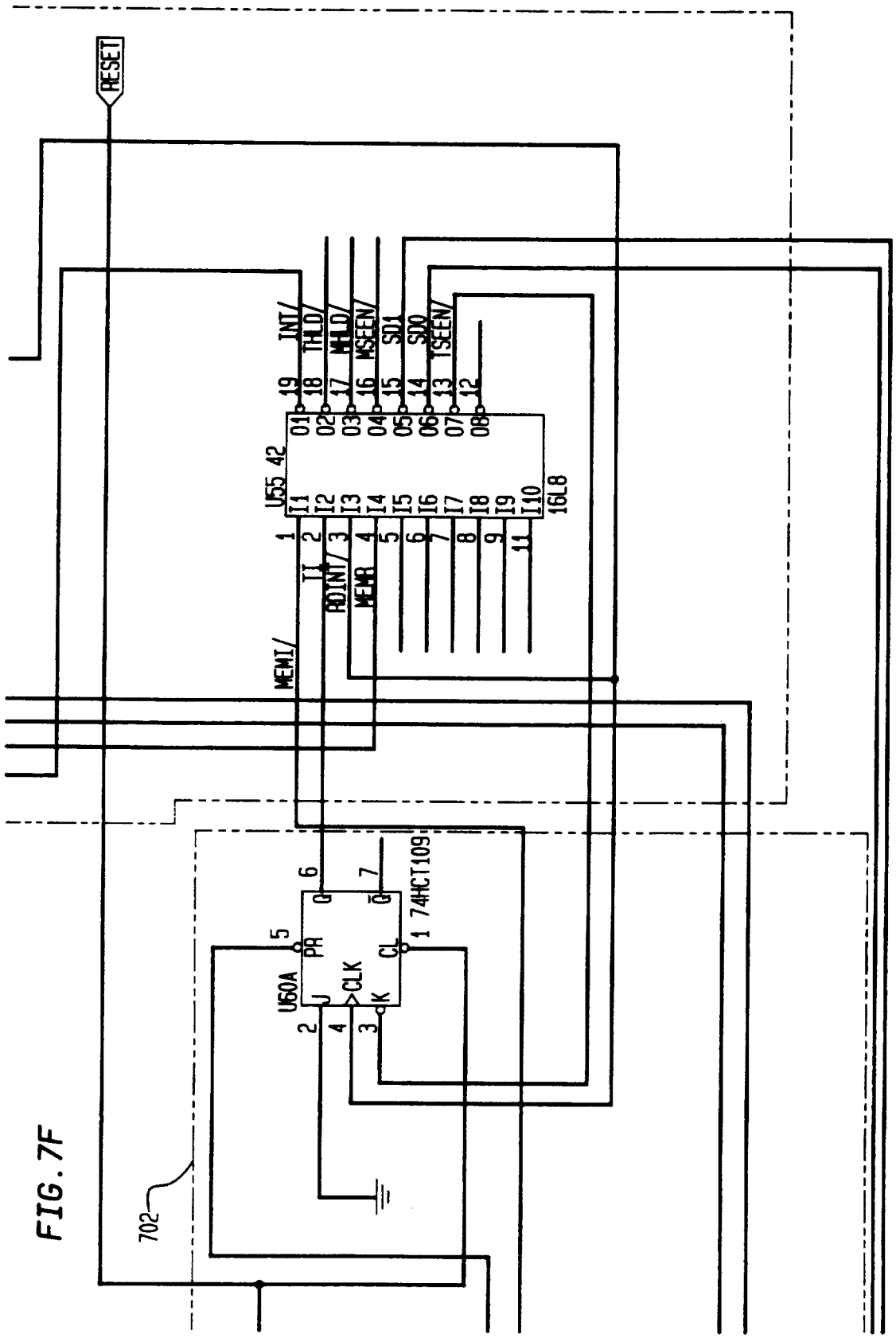
Figure 9B:
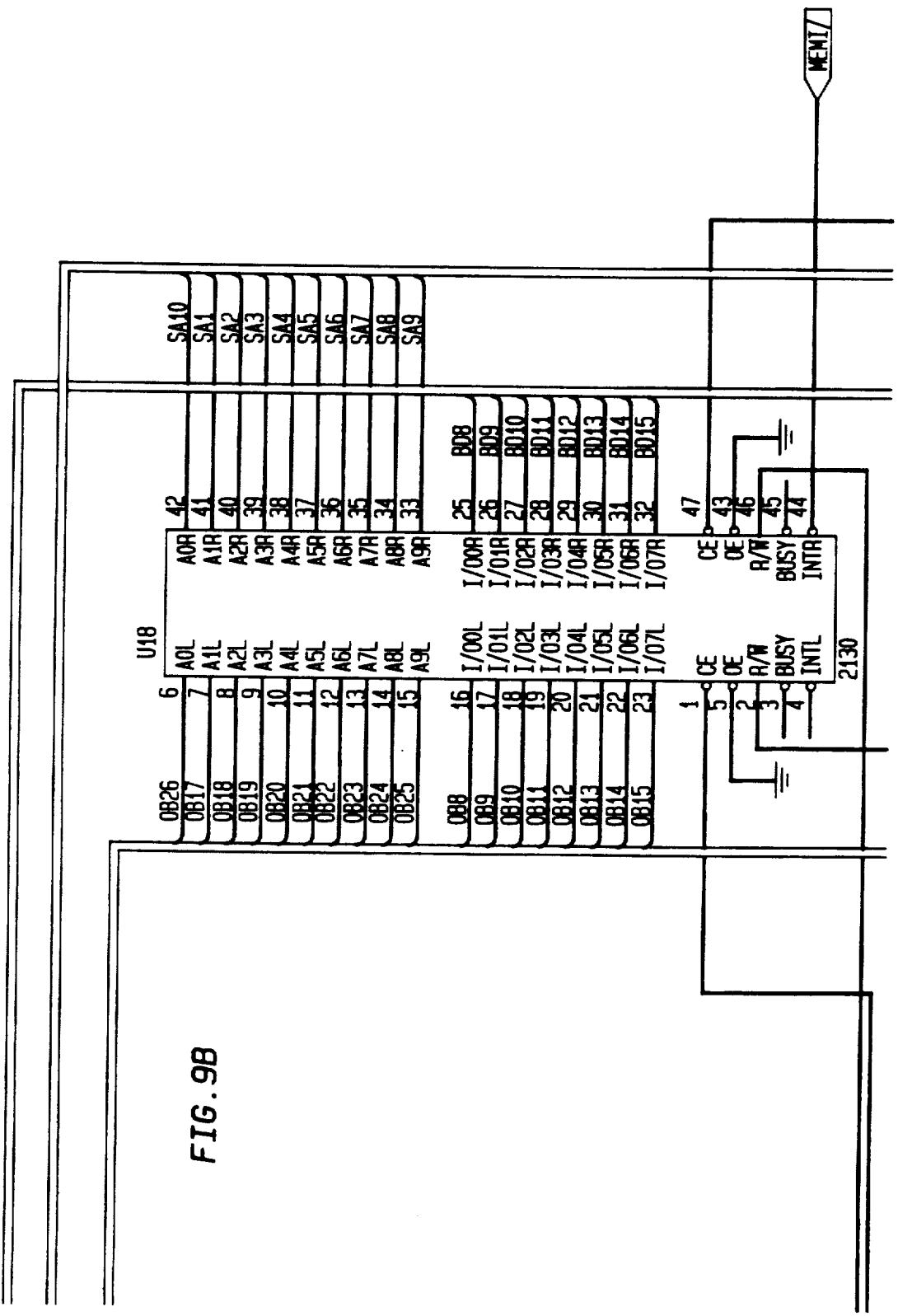
Figure 9C:
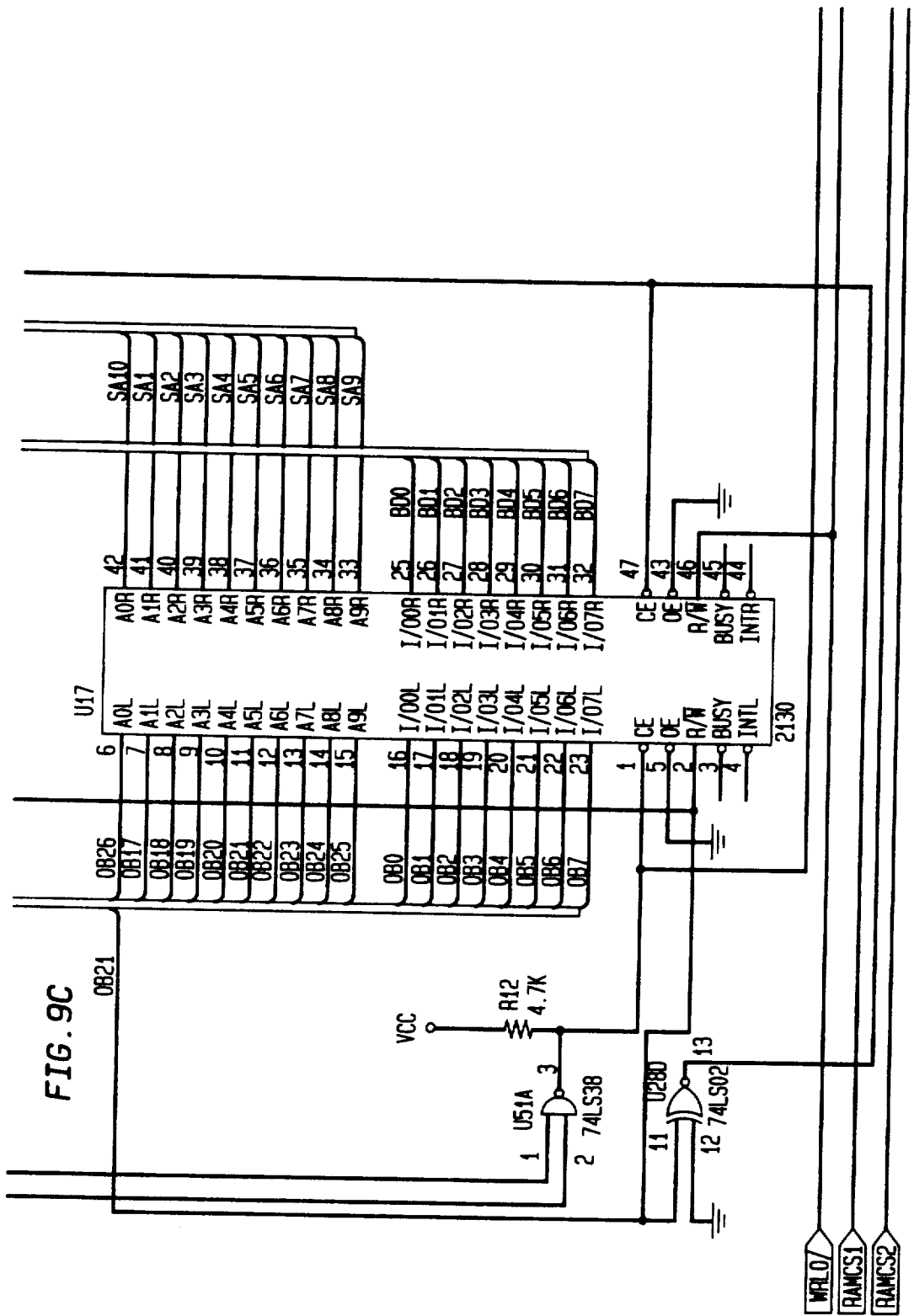
Figure 9D:
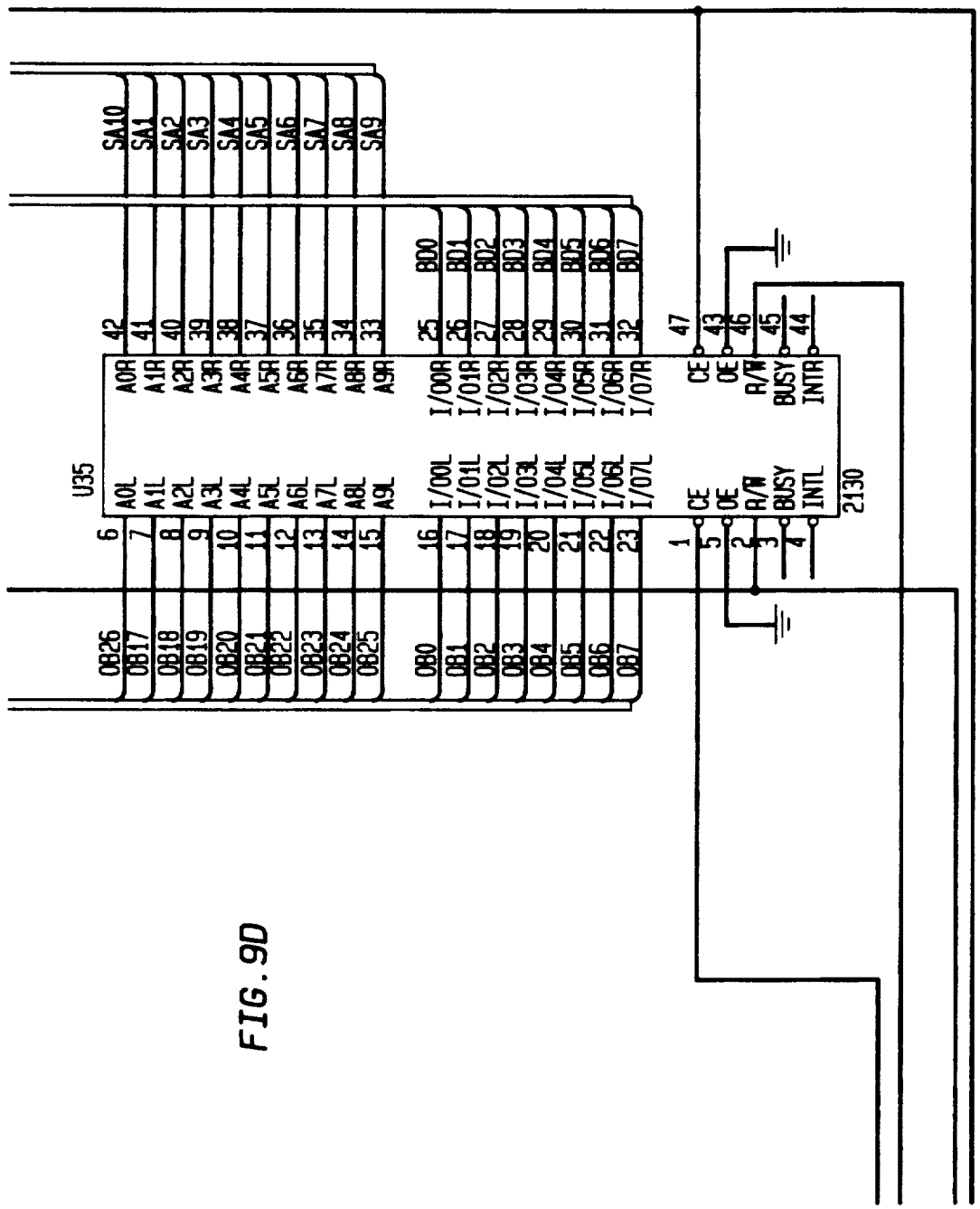

Buffer module 36 in FIG. 6C provides the invention with a mechanism to respond to read requests for specific bytes. Buffer module 36 is connected to two signals, RDHI and RDLO, and two busses, BD and SD. Signals RDHI and RDLO signify that either the high eight signals on the BD or SD busses (lines 8 through 15) or the low eight signals (lines 0 through 7) are of particular interest.

The detailed logic schematic in FIGS. 7A-7F illustrate the processing of signals from the connectors 24, 26, 28, and 30 that takes place in interface module 12 of FIG. 6B. Interface module 12 uses standard logic for communicating with the connectors 24, 26, 28, and 30. However, one of ordinary skill in the art can easily develop an embodiment of invention 10 for any commonly available computer bus. Furthermore, modification of invention 10 interface to bypass a system bus is also straight-forward for an individual trained in the art.

For example, the circuitry implementing invention 10 could be secured to a system motherboard bypassing the system bus and the attendant connectors 24, 26, 28, and 30. Interface module 12 comprises comparator component 700, PAL component 701 and error recording component 702.

The first component consisting of the logic and connections, represented in FIG. 7, between devices U58, U40, U57, and U59, is comparator component 700. Comparator component 700 determines that addresses or equivalently what combination of LA, SD, and SA signals will cause invention 10 to respond. The combination of devices U58 and U57 allow the user of invention 10 to select the memory space location from host processor 100 address space for invention 10's memory buffer. The user is not allowed to specify the buffer location until invention 10 has been enabled. Invention 10 is enabled through use of the devices U40 and U59. The user manually sets a sequence of 8 signals on the dip switch device U40 that are then compared with in-coming signals on the SA bus (SA2 through SA9). The AEN signal ultimately determines if this comparison is to take place. The AEN signal may keep the comparison from starting if the bus is being used by another device (i.e., for a DMA transfer). If the AEN is asserted and the SA signals match the U40 signals then a pulse travels between U59 and U54 (device 48 in the PAL component FIG. 8) ultimately resulting in a board enable (BDEN) signal travelling to (and enabling) the U58-U57 comparator devices. The device U58, upon receiving the BDEN signal, takes the data available on the system data bus on lines SD8 through SD15 and uses that as the address of invention 10 memory. When system address signals come in over LA17 through LA23 and SA16 they will be compared with the data loaded in U58 to see if the request concerns invention 10.

If the address signals match, then the signal BDSEL will be asserted and sent from U57 to U53 (device 38 in PAL component 701). If the address signals do not match then the remaining system bus signals will be ignored since they do not concern invention 10.

The second component consisting of the devices U12B, U22E, U22F, U28C, U51C, U53, U54, U55, and U56 and the accompanying logic represented in FIG. 7 is PAL component 701. The PAL component filters and transforms the raw signals that come from the connectors 24, 26, 28, and 30 into signals that can be used to control the remaining modules and the interaction between host processor 100 and remote machine 102. Three PALs used in the bus interface are U53, U54, and U55. Equations used to construct the PAL logic are listed in FIG. 8. The memory PAL—device U53—consumes signals BDSEL, MEMR, MEMW, SA11, SA0, SBHE, and BALE and produces signals RAMCSI, BDWR, MEMCS16, MEMON, MEMOFF, RDLO, RDHI, WRLO, WRHI, and RAMCS2. PAL memory is designed to translate all the memory requests into a set of signals that are understood and are instructive to the other modules of invention 10. PAL equations listed in FIG. 8 under the label MEMPAL show exactly how the output signals are derived from the input signals. The Input/Output PAL—device U54— consumes signals IOW, SA0, IOSEL, SAI, IOR, RESET, INT, SA15, SA14, SA10, IOSEL0, and IOSEL1 and produces signals INT9, INT10, INT11, RDINT, IOCS16, BDOFF, BDEN, INT12. IOPAL controls the loading of configuration information to invention 10 that specifies the interrupt number and invention 10's memory location. PAL equations listed in FIG. 8 under the label IOPAL show exactly how the output signals are derived from the input signals. The interrupt PAL—labeled as device U55—consumes signals MEMI, TI, RDINT, MEMR and produces signals INT, THLD, MHLD, MSEEN, and TSEEN. INTPAL controls the status reporting of invention 10. The equation for making the INTPAL are listed in FIG. 8 under the label INTPAL.

The third component, consisting of the logic represented in FIG. 7 by the part U60A is error recording component 702. The problem addressed by the error recording logic is: how will host processor 100's software be able to distinguish between two very different kinds of exceptions. Invention 10 handles the exception conditions utilizing a unique feature. Invention 10 is designed so that collisions, transmission errors, and hardware failures cause error signals to be raised on host processor 100 so that appropriate actions may be taken in operating system software. Invention 10 is kept as simple as possible by passing on as much complexity as possible to host processor 100's operating system software.

Two functions not handled by host processor 100 are data transmission error and an interrupt generated by remote processor 102. Handling a data transmission error is very costly since host processor 100's operating system software must take steps to correct a corrupted memory state. Invention 10 hardware need not provide any mechanism to handle transmission errors. Handling remotely generated interrupts simply requires that the corresponding interrupt be passed on to host processor 100. The common use of such a feature will be for remote processor 102 to fill an memory buffer of invention 10 with information and then generate an exception signal that will inform host processor 100 there is new data for it to process.

The detailed logic schematic in FIGS. 9A-9D illustrate the logic required for memory module 14. Three busses—BD, SA, and OB—as well as eight signals—WRITE, MEMI, WRHI, WRLO, RDHI, RDLO, RAMCS1, and RAMCS2 that are connected to memory module 14 are required. Here there are 4-1024 by 8 dual ported RAMs that form the physical memory used by invention 10.

Functionally, memory module 14 is responsible for responding to host processor 100's read and write requests just as any other memory. In addition, memory module 14 must allow remote write requests to its storage and pass host processor 100's write requests to the data transmission module 16. Invention 10 could use either more or less memory equally well.

Similarly, the memory can be of a variety of speeds and technologies. Additionally, invention 10 is not dependent on the use of dual ported RAMs. Standard memory cells could equally well be used provided that a memory arbiter, easily assembled by one of ordinary skill in the art, controlled the memory.

The RAM depicted in FIG. 9 is organized as a 2048 by 16 bit dual ported memory. All data and address signals of host processor 100 enter the individual dual ported RAMs through pins with names ending in the letter "R." The control pins CE, OE, R/W, BUSY, and INTR listed below the "R"-pins for the use with host processor 100's signals. Low order bytes of the memory are read or written by the host using the signals RDLO or WRLO. Similarly high order bytes are read or written by the host using the signals RDHI or WRHI. Any single dual ported RAM (U5, U17, U18, and U35) is selected by host processor 100 through a combination of the signals WRHI, WRLO, RDHI, RDLO, RAMCS1, and RAMCS2.

Remote processor 102 accesses the address and data signals of the dual ported RAMs through the left side pins which have names ending in the letter "L." The control signals for remote processor 102 are the signals CE, OE, R/W, BUSY, and INTL. Remote processor 102 has access to memory module 14 only though signals passed through the data receiver module 18 named OB0 through OB31 and WRITE. When remote processor 102 causes a WRITE assertion, the 16 bits of data and 10 bits of address encoded in signals OB0 through OB15 and OB17 through OB26 are available to the enabled dual ported RAMS.

Figure 10B:
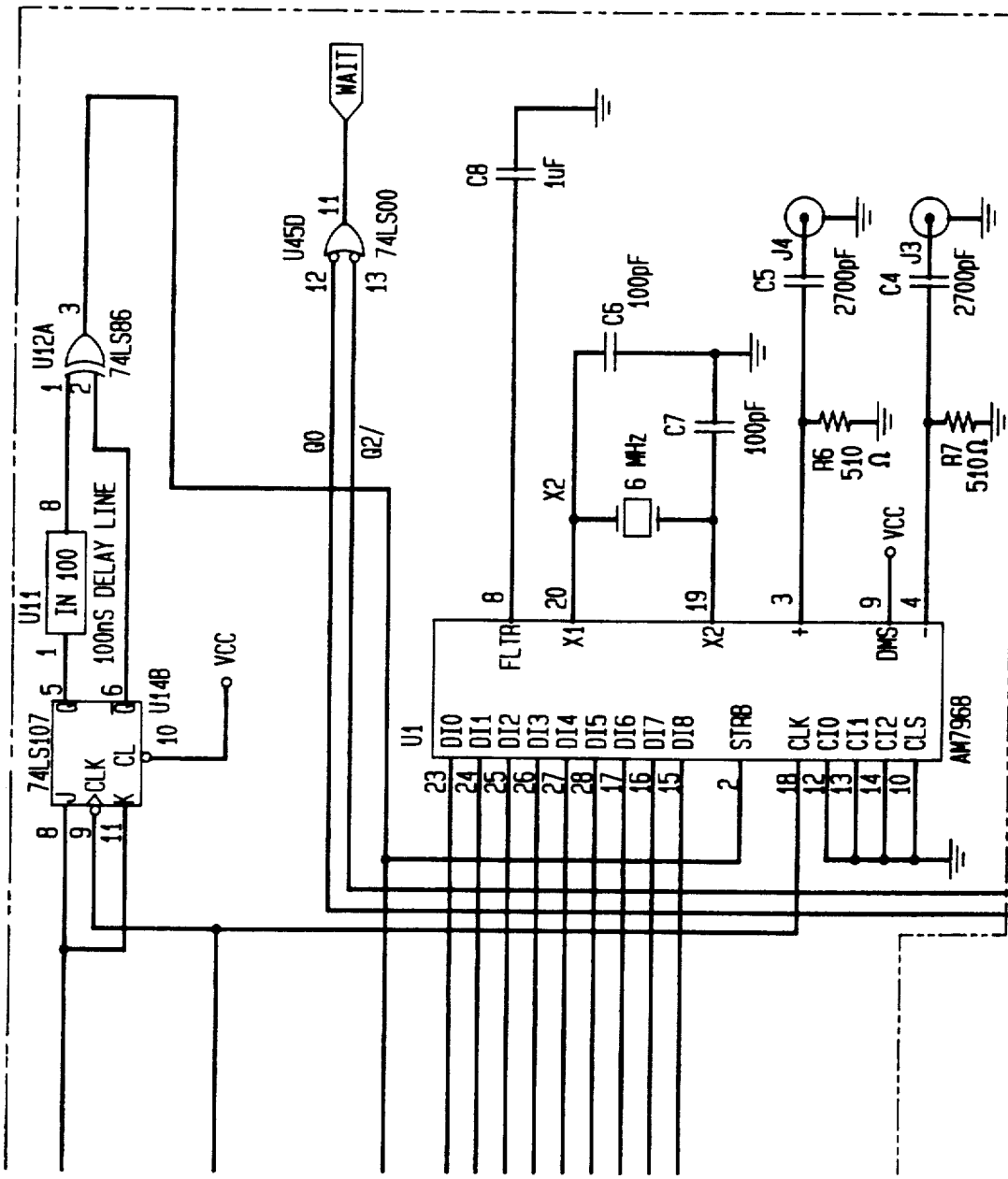
Figure 10C:
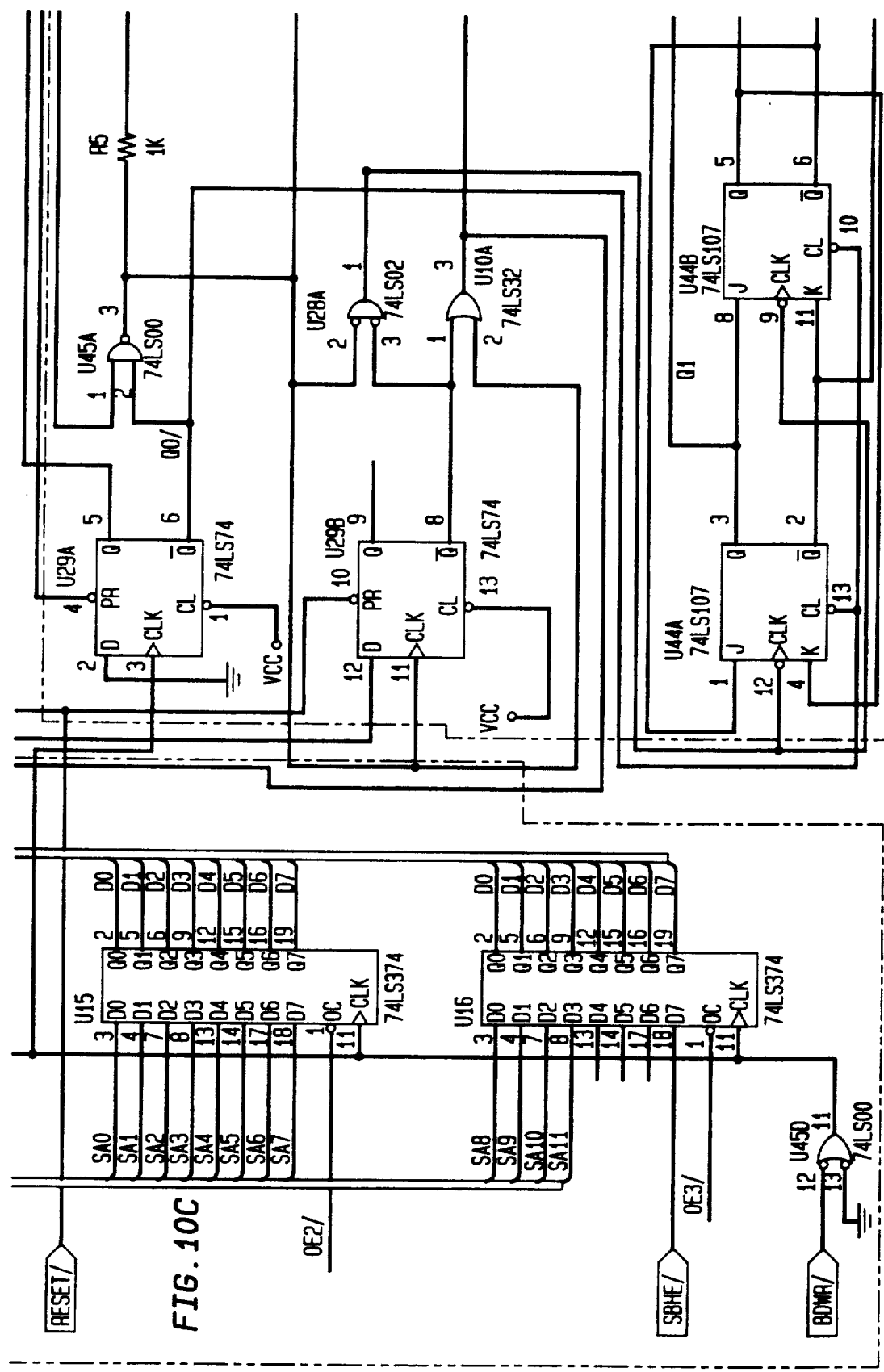
Figure 10D:
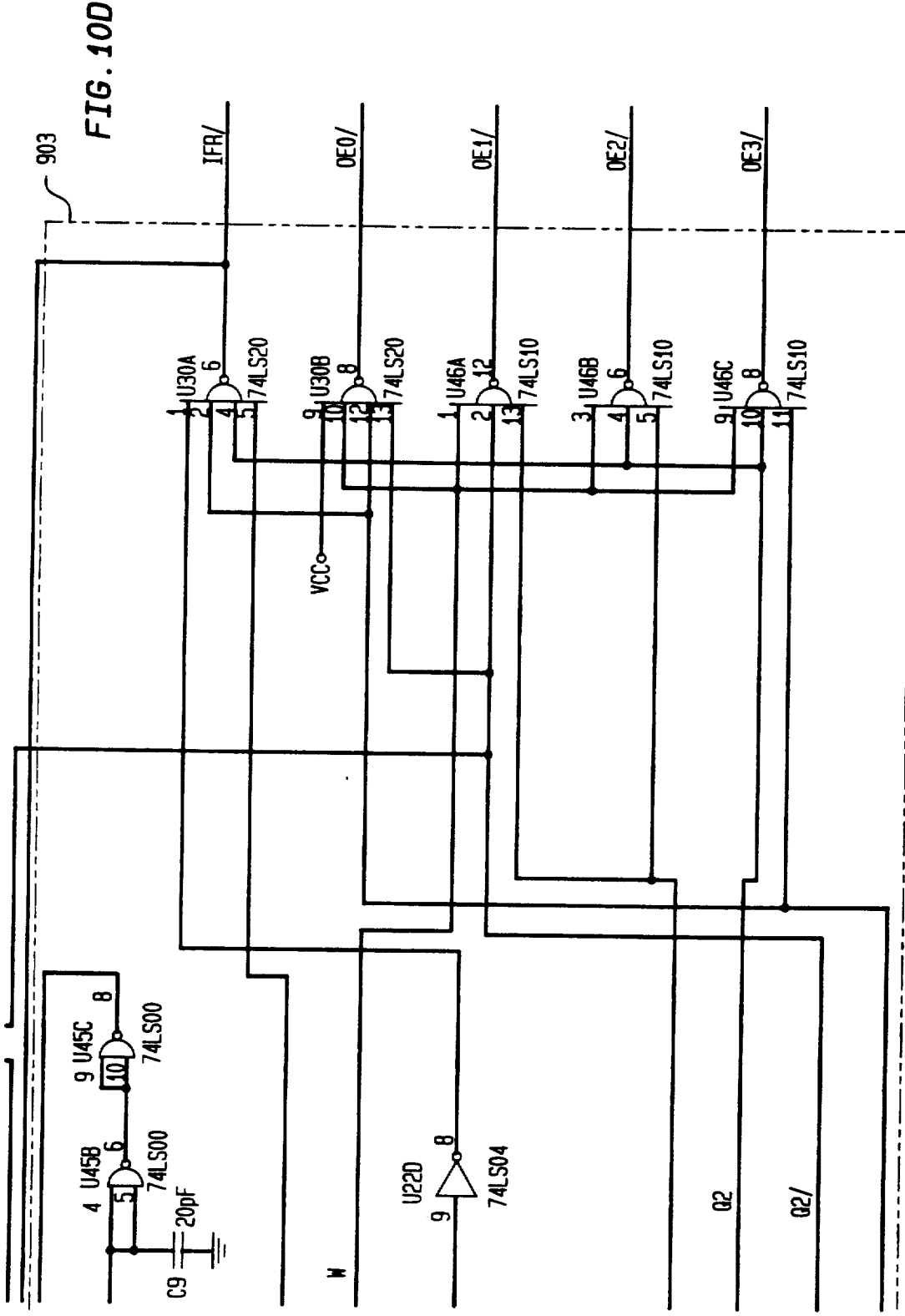
Figure 11B:
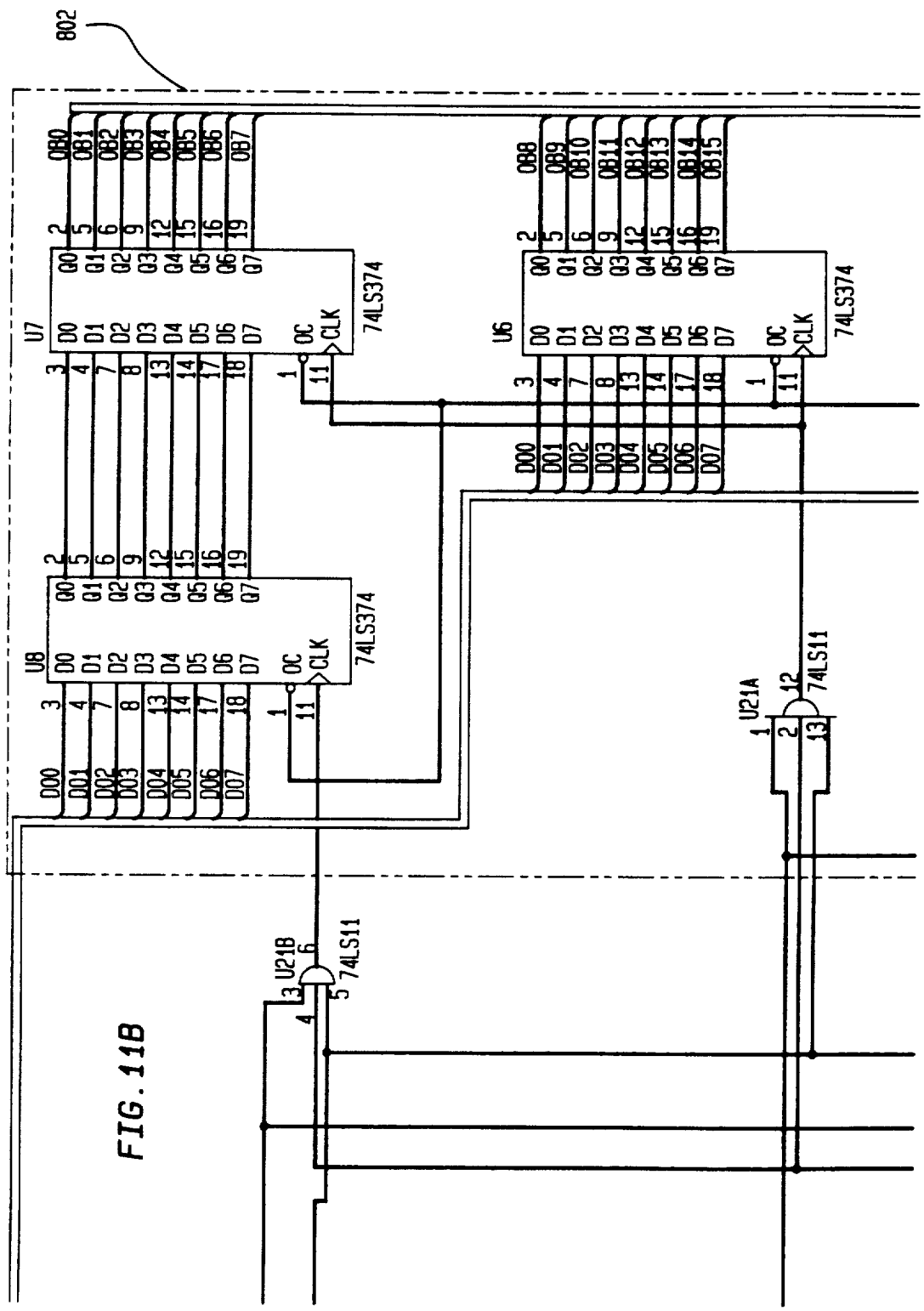
Figure 11C:
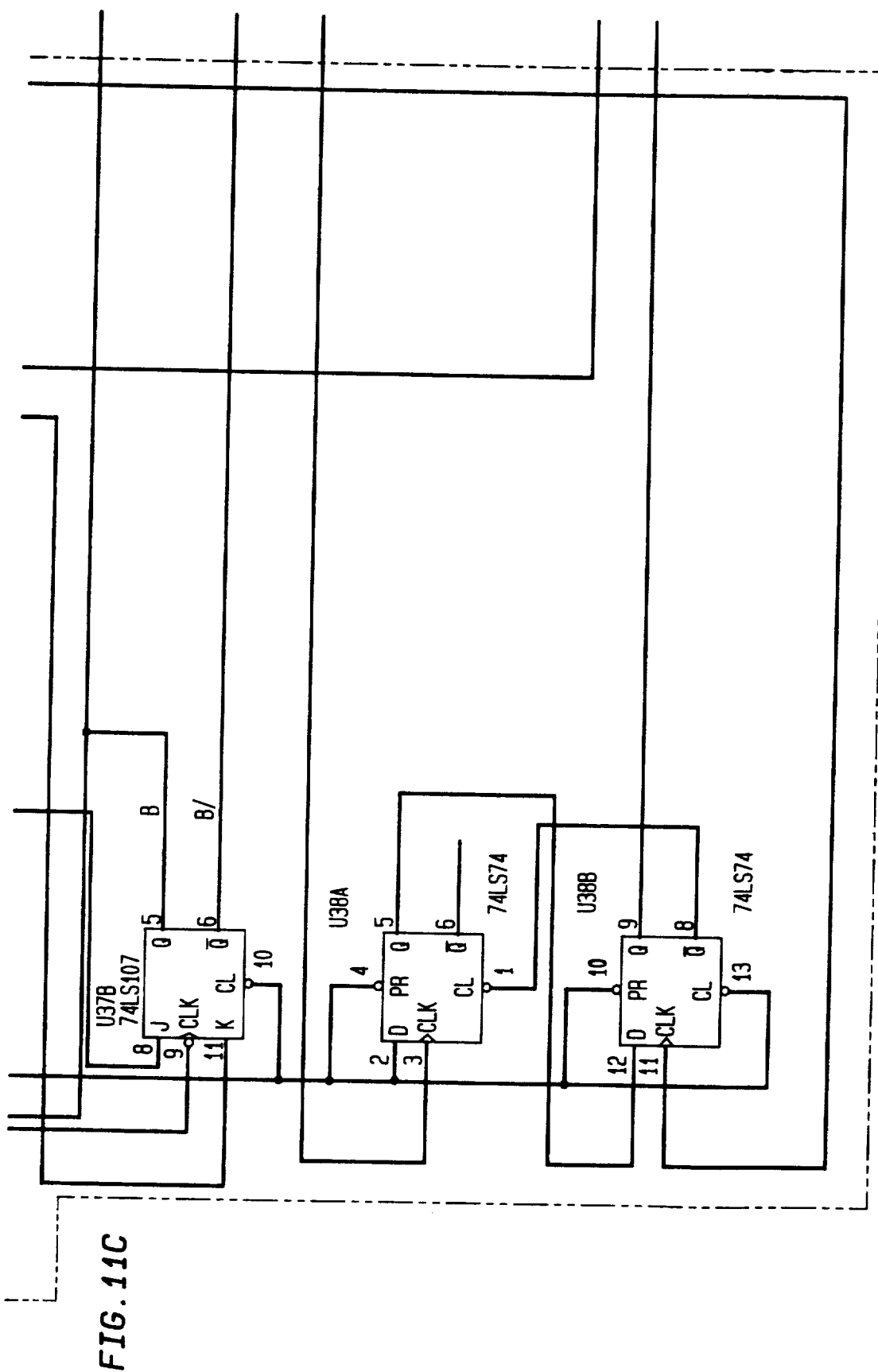
Figure 12:
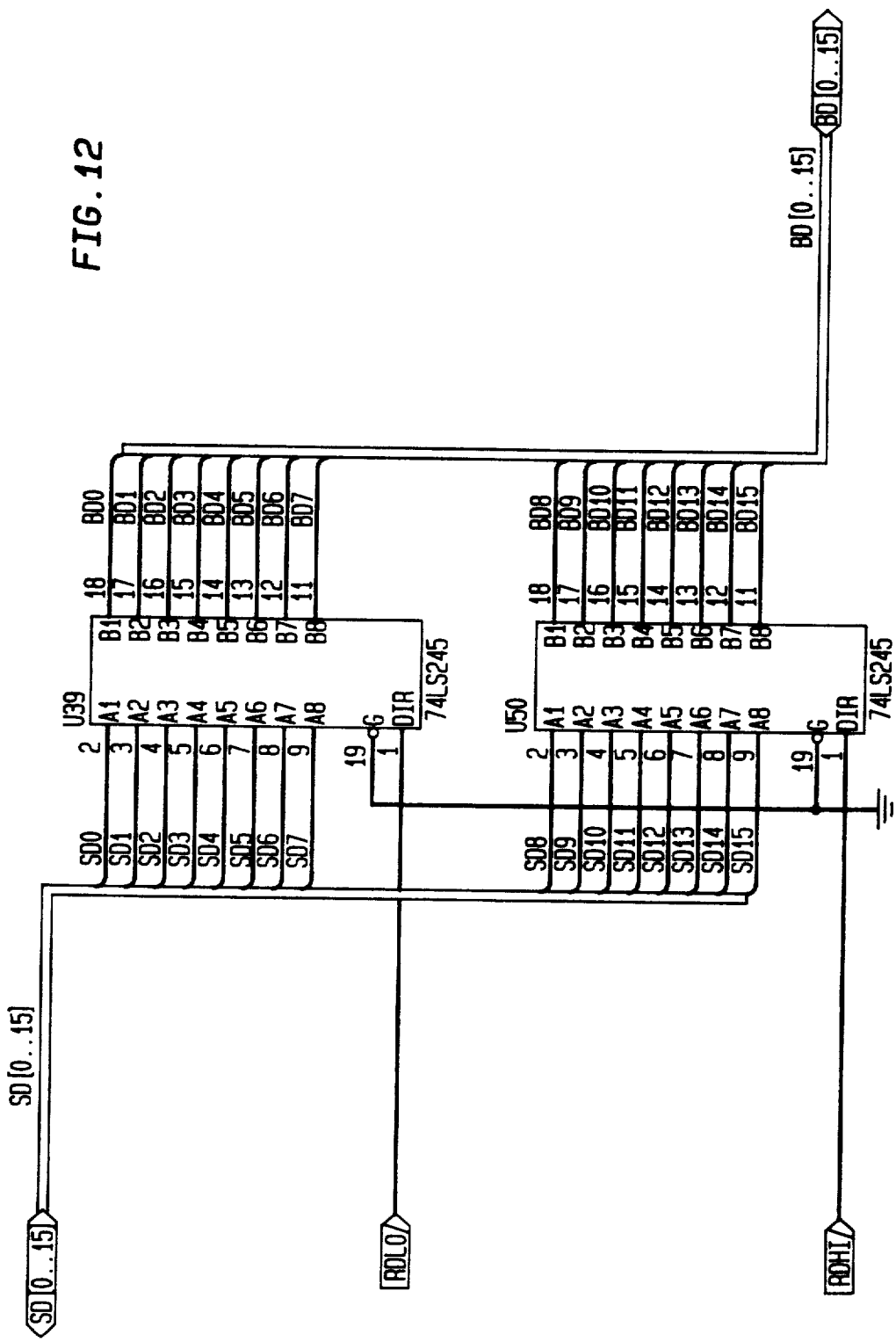
FIG. 12 illustrates a complete logic schematic of the buffer module that is responsible for filtering data signals for the memory module.

The detailed logic schematic in FIG. 10 illustrates the serialization logic contained in data transmitter module 16. The basic task of the data transmitter module 16 is to transmit a continuous stream of data coming in over 32 parallel wires (the DB bus). Transmitter module 16 is divided into three principal components: data bus component 901, state machine component 903, and data transmission component 902. Briefly, data bus component 901 is responsible for storing 4 blocks of 8 bits from the 32 bit incoming bus. Each of the 4 bytes will be transferred one at a time as dictated by the multiplexing state machine. The state machine signals the data bus latched bytes to drive the D bus through the signals OE0, OE1, OE2, and OE3. Once the data byte is driven on to the D bus it is sent to the data chip to be sent to remote processor 102.

Data bus component 901 assembles the control signals necessary for communication with remote processor 102 along with the required address and data signals. Four bytes of data that are to be sent to remote processor 102 and are stored in the four 74LS374s (U3, U4, U15, and U16). The OE signals from the state machine component allow the four bytes to be driven on the D bus to be sequentially loaded into the IDT7201 FIFO (U2) in the data transfer component. The clock pulse for driving a byte on to the D bus comes from the system bus interface module 12 in the signal BDWR.

State machine component 903 computes which of the currently stored bytes of data will be sent to the D bus as well as generating a signal that indicates which byte is the first of the four original bytes as an aid for reassembly at remote processor 102. Parts U29B, U28A, U10A, U22D, U44A, and U44B perform the state sequencing needed to generate the sequencing signals (OE0, OE1, OE2, and OE3) through AND gates U30A, U30B, U46A, U45B, and U45C as well as the U2 FIFO write signal and the D8 first byte signal. Parts U29A, U45A, U45B, U45C, and U30A generate the clock signal used by state machine component 903.

Data transmission component 902 assembles the data for transmission through U1. State machine component 903 signals the U2 FIFO when the time to store a new byte value arrives. U2 FIFO buffers the data being sent out. Data buffering for, and data transfers to, U1 is controlled by the parts U14A, U13B, U14B, U11, and U12A. After a data byte is transferred from U2 to U1 it is subsequently serialized and sent over the J4 and J3 connections.

The detailed logic schematic in FIGS. 11A-11D illustrate the data assembly logic contained in data receiver module 18. The basic task of receiver module 18 is to assemble incoming signals from remote processor 102 into a 32 bit data word that can be driven on to the OB bus. Data receiver module 18 comprises data reception component 801, state control component 803, and byte demultiplexing component 802. Data reception component 801 assembles the data and clock signals sent by remote processor 102 for transmission over the DO bus. State control component 803 controls the staging of the incoming four byte data stream. It ensures that host processor 100 will be able to distinguish the first byte of the byte stream from subsequent bytes. Byte demultiplexing component 802 stores each of the four bytes away for later transmission over the OB bus.

Data reception component 801 consists of the logic represented in FIG. 11. Device AM7969 (U9) takes a serial stream of data and gathers it into a parallel set of 8 signals that are available over signals DO0 through DO7. Bytes of data that come into the data reception component are grouped into sets of four. The first byte of such a group is distinguished by setting DO8 high. Reception of DO8 high allows the data reception component to initialize state control component 803.

State control component 803 consists of logic represented in FIG. 9. Devices U37A and U37B act in unison with the AND gates U21A, U21C, and U38A to latch four consecutive bytes into the byte demultiplexing component 802. The first of the four bytes is indicated by the signal coming off the DO8 pin of the U9 device. Similar in function to the U37 state machine the latches U38A and U38B keep track of how many of the expected four bytes have been received so that when the fourth byte arrives a WRITE signal can be generated for memory module 14.

Byte demultiplexing component 802 consists of logic represented in FIG. 11. Component 802 must latch each of four consecutive bytes off the DO bus and hold them for transmission over the OB bus to the memory module 14. The sequential 74LS374s (U8 and U7) are used to provide additional time to drive signals on to the OB bus while data is streaming in from the AM7969 (device U9).

Invention 10 just described has several distinct advantages over prior art devices. The classical computer engineering problem of transmission line latency cease to be a concern for the invention hardware since all memory references are made to local RAM. For example, the time needed for a signal to travel down a 50 foot transmission line (the transmission line latency or network latency) can exceed the timing constraints of many popular computer system busses. In such cases, the bus "times out" if the circuitry does not respond fast enough to the system commands. In effect, the bus assumes the circuitry is broken or malfunctioning. A major obstacle to the production of longer computer busses and fast computer networks from the prior art is the latency problem.

Since the invention uses local RAM exclusively, the problem of transmission line latency becomes a software problem instead of a hardware problem Long delays for network latency can cause the oblivious memory to become inconsistent but cannot make the local bus time out.

Oblivious memory hardware allows for memory to become incoherent in order to gain greater communication efficiency. Software written to take advantage of the invention can prevent the execution of instruction sequences that cause the oblivious memory to become incoherent.

Among the unique features possessed by the invention are the following:

First, data on remote machines can be stored or accessed approximately the same as if stored or accessed locally.

Second, the invention provides low latency pipelined performance, for example, the time required to transmit a 4 byte message apart from network latency time, is approximately one fourth the time required to transmit a 16 byte message.

Third, the invention can transmit over existing transmission media.

Fourth, the invention can link heterogeneous computer systems running different operating systems without elaborate protocol hardware or software.

Fifth, the invention eliminates the need for expensive communication processor manufacturing and overhead costs.

Sixth, one way communication is now possible on general purpose networks. This is desirable in applications that require high security and access to uncontrolled computer networks.

Seventh, high bandwidth communication between processors of widely differing processing abilities such a Cray and a personal computer is now possible.

While the invention has been described with reference to a preferred embodiment thereof, it will be appreciated by those of ordinary skill in the art that modifications can be made to the parts that comprise the invention without departing from the spirit and scope thereof.

We claim:

1. In a system comprising at least first and second computers, both said computers including memory with read/write capability, said computers being interconnected so as to enable data written into memory of either said computer to be transmitted to the other computer for writing into its memory, said system performing a method comprising the steps of:

a. performing a series of write actions of a first series of data into the memory of said first computer and a second series of data into the memory of said second computer; and b. upon the performance of each said write action in either or both said computers, concurrently transmitting the data associated with said write action, along with an indication that said data is to be written to memory, to the other computer, each said transmission occurring automatically in a transmitting computer without regard to a next action following said write action and without regard to a processing state of said other computer, said transmitting computer preceding to a next write action for a next in said series of data, whether or not said other computer accomplishes its write to memory of data from said transmitting computer.

2. The method as recited in claim 1, wherein step (a) includes the writing to memory of a series of values, and wherein each said computer performs such writes without waiting for a signal from the other computer that it has successfully accomplished its writes to memory of any of said values.

3. The method as recited in claim 1 wherein said first and second computers perform all read and write commands solely with their respective memories.

4. The method as recited in claim 1 wherein the generation of a write command by one said computer to its memory, automatically causes said transmission of data to occur without the need for another express command.

5. The method as recited in claim 1 wherein read actions are interspersed among said write actions, a read action enabled to occur immediately after a write action, nothwithstanding said transmission of said data having occurred.

6. The method as recited in claim 1 wherein said second computer performs logically generated read and write actions identically as said first computer, and said first computer carries out writes to its memory of data transmitted from said second computer identically as does said second computer for data transmitted from said first computer.

7. The method as recited in claim 1 wherein step (a) causes said first computer to write into its memory a set of data values, and wherein said second computer stores said set of data values, said second computer performing the added step of:
   c. preventing access to any stored value of said set until said second computer determines that said set is entirely present in its memory.

8. The method as recited in claim 7 wherein step (a) includes the further step of:
   a1. when said first computer has written all said set of data values into its memory, transmitting an indication of such action to said second computer, said second computer employing said indication to allow access to said set of data values in its memory.

9. The method as recited in claim 8 wherein said indication is a write of a value to a predetermined address in memory.

* * * * *